United States Patent
Islam et al.

US 10,033,753 B1
*Jul. 24, 2018

(54) SYSTEM AND METHOD FOR DETECTING MALICIOUS ACTIVITY AND CLASSIFYING A NETWORK COMMUNICATION BASED ON DIFFERENT INDICATOR TYPES

(71) Applicant: FireEye, Inc., Milpitas, CA (US)

(72) Inventors: Ali Islam, Milpitas, CA (US); Zheng Bu, Fremont, CA (US)

(73) Assignee: FireEye, Inc., Milpitas, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/495,629

(22) Filed: Apr. 24, 2017

Related U.S. Application Data

(63) Continuation of application No. 13/895,271, filed on May 13, 2013, now Pat. No. 9,635,039.

(51) Int. Cl.
*H04L 29/06* (2006.01)

(52) U.S. Cl.
CPC ........ *H04L 63/1425* (2013.01); *H04L 63/145* (2013.01); *H04L 63/1416* (2013.01)

(58) Field of Classification Search
CPC ............... G06F 63/1441; G06F 63/145; G06F 63/1408; G06F 63/1416; G06F 63/1466;
(Continued)

(56) References Cited

U.S. PATENT DOCUMENTS 4,292,580 A 9/1981 Ott et al.
5,175,732 A 12/1992 Hendel et al.
(Continued)

FOREIGN PATENT DOCUMENTS

GB 2439806 A 1/2008
WO 0206928 A2 1/2002
(Continued)

OTHER PUBLICATIONS

Whyte et al.: DNS-based Detection of Scanning Worms in an Enterprise Network, Proceed. of the 12th Ann. Network and Distributed Systems Security Symposium, San Diego, CA, Feb. 3-4, 2005.*

(Continued)

*Primary Examiner* — Hadi S Armouche
*Assistant Examiner* — Paul E Callahan
(74) *Attorney, Agent, or Firm* — Rutan & Tucker, LLP

(57) ABSTRACT

One embodiment of a method for detecting a cyber-attack features first and second analyzes. The first analysis is conducted on content of a communication to determine at least a first high quality indicator. The first high quality indicator represents a first probative value for classification. The second analysis is conducted on metadata related to the content to determine supplemental indicator(s). Each of the supplemental indicator(s) is represented by a probative value for classification. The communication is classified as being part of the cyber-attack when the first probative value exceeds a predetermined threshold without consideration of the corresponding probative values for the supplemental indicator(s). In response to the first high quality indicator failing to classify the network communication, using the corresponding probative values associated with the one or more supplemental indicators with at least the first probative value to classify the network communication as being part of the cyber-attack.

25 Claims, 10 Drawing Sheets

(58) Field of Classification Search
CPC .............. G06F 63/1491; G06F 21/566; H04L 129/06918
See application file for complete search history.

(56) References Cited

U.S. PATENT DOCUMENTS

| | | | |
|---|---|---|---|
| 5,440,723 A | 8/1995 | Arnold et al. | |
| 5,657,473 A | 8/1997 | Killean et al. | |
| 5,842,002 A | 11/1998 | Schnurer et al. | |
| 5,978,917 A | 11/1999 | Chi | |
| 6,088,803 A | 7/2000 | Tso et al. | |
| 6,094,677 A | 7/2000 | Capek et al. | |
| 6,269,330 B1 | 7/2001 | Cidon et al. | |
| 6,279,113 B1 | 8/2001 | Vaidya | |
| 6,298,445 B1 | 10/2001 | Shostack et al. | |
| 6,357,008 B1 | 3/2002 | Nachenberg | |
| 6,424,627 B1 | 7/2002 | S.o slashed.rhaug et al. | |
| 6,484,315 B1 | 11/2002 | Ziese | |
| 6,487,666 B1 | 11/2002 | Shanklin et al. | |
| 6,493,756 B1 | 12/2002 | O'Brien et al. | |
| 6,550,012 B1 | 4/2003 | Villa et al. | |
| 6,775,657 B1 | 8/2004 | Baker | |
| 6,832,367 B1 | 12/2004 | Choi et al. | |
| 6,895,550 B2 | 5/2005 | Kanchirayappa et al. | |
| 6,898,632 B2 | 5/2005 | Gordy et al. | |
| 6,907,396 B1 | 6/2005 | Muttik et al. | |
| 6,981,279 B1 | 12/2005 | Arnold et al. | |
| 7,007,107 B1 | 2/2006 | Ivchenko et al. | |
| 7,028,179 B2 | 4/2006 | Anderson et al. | |
| 7,043,757 B2 | 5/2006 | Hoefelmeyer et al. | |
| 7,069,316 B1 | 6/2006 | Gryaznov | |
| 7,080,408 B1 | 7/2006 | Pak et al. | |
| 7,093,002 B2 | 8/2006 | Wolff et al. | |
| 7,093,239 B1 | 8/2006 | van der Made | |
| 7,100,201 B2 | 8/2006 | Izatt | |
| 7,159,149 B2 | 1/2007 | Spiegel et al. | |
| 7,231,667 B2 | 6/2007 | Jordan | |
| 7,240,364 B1 | 7/2007 | Branscomb et al. | |
| 7,240,368 B1 | 7/2007 | Roesch et al. | |
| 7,287,278 B2 | 10/2007 | Liang | |
| 7,308,716 B2 | 12/2007 | Danford et al. | |
| 7,356,736 B2 | 4/2008 | Natvig | |
| 7,386,888 B2 | 6/2008 | Liang et al. | |
| 7,392,542 B2 | 6/2008 | Bucher | |
| 7,418,729 B2 | 8/2008 | Szor | |
| 7,428,300 B1 | 9/2008 | Drew et al. | |
| 7,441,272 B2 | 10/2008 | Durham et al. | |
| 7,448,084 B1 | 11/2008 | Apap et al. | |
| 7,458,098 B2 | 11/2008 | Judge et al. | |
| 7,464,404 B2 | 12/2008 | Carpenter et al. | |
| 7,464,407 B2 | 12/2008 | Nakae et al. | |
| 7,467,408 B1 | 12/2008 | O'Toole, Jr. | |
| 7,480,773 B1 | 1/2009 | Reed | |
| 7,487,543 B2 | 2/2009 | Arnold et al. | |
| 7,496,960 B1 | 2/2009 | Chen et al. | |
| 7,496,961 B2 | 2/2009 | Zimmer et al. | |
| 7,519,990 B1 | 4/2009 | Xie | |
| 7,523,493 B2 | 4/2009 | Liang et al. | |
| 7,530,104 B1 | 5/2009 | Thrower et al. | |
| 7,540,025 B2 | 5/2009 | Tzadikario | |
| 7,565,550 B2 | 7/2009 | Liang et al. | |
| 7,603,715 B2 | 10/2009 | Costa et al. | |
| 7,607,171 B1 | 10/2009 | Marsden et al. | |
| 7,639,714 B2 | 12/2009 | Stolfo et al. | |
| 7,644,441 B2 | 1/2010 | Schmid et al. | |
| 7,676,841 B2 | 3/2010 | Sobchuk et al. | |
| 7,698,548 B2 | 4/2010 | Shelest et al. | |
| 7,707,633 B2 | 4/2010 | Danford et al. | |
| 7,779,463 B2 | 8/2010 | Stolfo et al. | |
| 7,784,097 B1 | 8/2010 | Stolfo et al. | |
| 7,832,008 B1 | 11/2010 | Kraemer | |
| 7,849,506 B1 | 12/2010 | Dansey et al. | |
| 7,869,073 B2 | 1/2011 | Oshima | |
| 7,877,803 B2 | 1/2011 | Enstone et al. | |
| 7,904,959 B2 | 3/2011 | Sidiroglou et al. | |
| 7,908,660 B2 | 3/2011 | Bahl | |
| 7,930,738 B1 | 4/2011 | Petersen | |
| 7,937,761 B1 | 5/2011 | Bennett | |
| 7,996,556 B2 | 8/2011 | Raghavan et al. | |
| 7,996,836 B1 | 8/2011 | McCorkendale et al. | |
| 7,996,905 B2 | 8/2011 | Arnold et al. | |
| 8,006,305 B2 | 8/2011 | Aziz | |
| 8,010,667 B2 | 8/2011 | Zhang et al. | |
| 8,020,206 B2 | 9/2011 | Hubbard et al. | |
| 8,028,338 B1 | 9/2011 | Schneider et al. | |
| 8,045,094 B2 | 10/2011 | Teragawa | |
| 8,045,458 B2 | 10/2011 | Alperovitch et al. | |
| 8,069,484 B2 | 11/2011 | McMillan et al. | |
| 8,087,086 B1 | 12/2011 | Lai et al. | |
| 8,171,553 B2 | 5/2012 | Aziz et al. | |
| 8,201,246 B1 | 6/2012 | Wu et al. | |
| 8,204,984 B1 | 6/2012 | Aziz et al. | |
| 8,220,055 B1 | 7/2012 | Kennedy | |
| 8,225,288 B2 | 7/2012 | Miller et al. | |
| 8,225,373 B2 | 7/2012 | Kraemer | |
| 8,233,882 B2 | 7/2012 | Rogel | |
| 8,234,709 B2 | 7/2012 | Viljoen et al. | |
| 8,239,944 B1 | 8/2012 | Nachenberg et al. | |
| 8,286,251 B2 | 10/2012 | Eker et al. | |
| 8,291,499 B2 | 10/2012 | Aziz et al. | |
| 8,307,435 B1 | 11/2012 | Mann et al. | |
| 8,307,443 B2 | 11/2012 | Wang et al. | |
| 8,312,545 B2 | 11/2012 | Tuvell et al. | |
| 8,321,936 B1 | 11/2012 | Green et al. | |
| 8,321,941 B2 | 11/2012 | Tuvell et al. | |
| 8,365,286 B2 | 1/2013 | Poston | |
| 8,370,938 B1 | 2/2013 | Daswani et al. | |
| 8,370,939 B2 | 2/2013 | Laitsev et al. | |
| 8,375,444 B2 | 2/2013 | Aziz et al. | |
| 8,381,299 B2 | 2/2013 | Stolfo et al. | |
| 8,402,529 B1 | 3/2013 | Green et al. | |
| 8,510,827 B1 | 8/2013 | Leake et al. | |
| 8,510,842 B2 | 8/2013 | Amit et al. | |
| 8,516,593 B2 | 8/2013 | Aziz | |
| 8,528,086 B1 | 9/2013 | Aziz | |
| 8,539,582 B1 | 9/2013 | Aziz et al. | |
| 8,549,638 B2 | 10/2013 | Aziz | |
| 8,555,388 B1 * | 10/2013 | Wang | H04L 63/1416 709/245 |
| 8,561,177 B1 | 10/2013 | Aziz et al. | |
| 8,566,946 B1 | 10/2013 | Aziz et al. | |
| 8,584,094 B2 | 11/2013 | Dadhia et al. | |
| 8,584,234 B1 | 11/2013 | Sobel et al. | |
| 8,584,239 B2 | 11/2013 | Aziz et al. | |
| 8,595,834 B2 | 11/2013 | Xie et al. | |
| 8,627,476 B1 | 1/2014 | Satish et al. | |
| 8,635,696 B1 | 1/2014 | Aziz | |
| 8,713,681 B2 | 4/2014 | Silberman et al. | |
| 8,738,906 B1 * | 5/2014 | Sampath | H04N 21/643 713/166 |
| 8,850,571 B2 * | 9/2014 | Staniford | H04L 63/1416 713/187 |
| 8,881,282 B1 | 11/2014 | Aziz et al. | |
| 8,898,788 B1 | 11/2014 | Aziz et al. | |
| 8,935,779 B2 | 1/2015 | Manni et al. | |
| 8,984,638 B1 | 3/2015 | Aziz et al. | |
| 8,990,939 B2 | 3/2015 | Staniford et al. | |
| 8,990,944 B1 | 3/2015 | Singh et al. | |
| 8,997,219 B2 | 3/2015 | Staniford et al. | |
| 9,009,822 B1 | 4/2015 | Ismael et al. | |
| 9,009,823 B1 | 4/2015 | Ismael et al. | |
| 9,027,135 B1 | 5/2015 | Aziz | |
| 9,071,638 B1 | 6/2015 | Aziz et al. | |
| 9,104,867 B1 | 8/2015 | Thioux et al. | |
| 9,106,694 B2 | 8/2015 | Aziz et al. | |
| 9,118,715 B2 | 8/2015 | Staniford et al. | |
| 9,159,035 B1 | 10/2015 | Ismael et al. | |
| 9,171,160 B2 | 10/2015 | Vincent et al. | |
| 9,176,843 B1 | 11/2015 | Ismael et al. | |
| 9,189,627 B1 | 11/2015 | Islam | |
| 9,195,829 B1 | 11/2015 | Goradia et al. | |
| 9,197,664 B1 | 11/2015 | Aziz et al. | |
| 9,223,972 B1 | 12/2015 | Vincent et al. | |
| 9,225,740 B1 | 12/2015 | Ismael et al. | |

(56) References Cited

U.S. PATENT DOCUMENTS

| | | |
|---|---|---|
| 9,241,010 B1 | 1/2016 | Bennett et al. |
| 9,251,343 B1 | 2/2016 | Vincent et al. |
| 9,635,039 B1 | 4/2017 | Islam et al. |
| 2001/0005889 A1 | 6/2001 | Albrecht |
| 2001/0047326 A1 | 11/2001 | Broadbent et al. |
| 2002/0018903 A1 | 2/2002 | Kokubo et al. |
| 2002/0038430 A1 | 3/2002 | Edwards et al. |
| 2002/0091819 A1 | 7/2002 | Melchione et al. |
| 2002/0144156 A1 | 10/2002 | Copeland |
| 2002/0162015 A1 | 10/2002 | Tang |
| 2002/0166063 A1 | 11/2002 | Lachman et al. |
| 2002/0184528 A1 | 12/2002 | Shevenell et al. |
| 2002/0188887 A1 | 12/2002 | Largman et al. |
| 2002/0194490 A1 | 12/2002 | Halperin et al. |
| 2003/0074578 A1 | 4/2003 | Ford et al. |
| 2003/0084318 A1 | 5/2003 | Schertz |
| 2003/0115483 A1 | 6/2003 | Liang |
| 2003/0188190 A1 | 10/2003 | Aaron et al. |
| 2003/0200460 A1 | 10/2003 | Morota et al. |
| 2003/0212902 A1 | 11/2003 | van der Made |
| 2003/0237000 A1 | 12/2003 | Denton et al. |
| 2004/0003323 A1 | 1/2004 | Bennett et al. |
| 2004/0015712 A1 | 1/2004 | Szor |
| 2004/0019832 A1 | 1/2004 | Arnold et al. |
| 2004/0047356 A1 | 3/2004 | Bauer |
| 2004/0083408 A1 | 4/2004 | Spiegel et al. |
| 2004/0093513 A1 | 5/2004 | Cantrell et al. |
| 2004/0111531 A1 | 6/2004 | Staniford et al. |
| 2004/0165588 A1 | 8/2004 | Pandya |
| 2004/0236963 A1 | 11/2004 | Danford et al. |
| 2004/0243349 A1 | 12/2004 | Greifeneder et al. |
| 2004/0249911 A1 | 12/2004 | Alkhatib et al. |
| 2004/0255161 A1 | 12/2004 | Cavanaugh |
| 2004/0268147 A1 | 12/2004 | Wiederin et al. |
| 2005/0021740 A1 | 1/2005 | Bar et al. |
| 2005/0033960 A1 | 2/2005 | Vialen et al. |
| 2005/0033989 A1 | 2/2005 | Poletto et al. |
| 2005/0050148 A1 | 3/2005 | Mohammadioun et al. |
| 2005/0086523 A1 | 4/2005 | Zimmer et al. |
| 2005/0091513 A1 | 4/2005 | Mitomo et al. |
| 2005/0091533 A1 | 4/2005 | Omote et al. |
| 2005/0114663 A1 | 5/2005 | Cornell et al. |
| 2005/0125195 A1 | 6/2005 | Brendel |
| 2005/0157662 A1 | 7/2005 | Bingham et al. |
| 2005/0183143 A1 | 8/2005 | Anderholm et al. |
| 2005/0201297 A1 | 9/2005 | Peikari |
| 2005/0210533 A1 | 9/2005 | Copeland et al. |
| 2005/0238005 A1 | 10/2005 | Chen et al. |
| 2005/0265331 A1 | 12/2005 | Stolfo |
| 2006/0010495 A1 | 1/2006 | Cohen et al. |
| 2006/0015715 A1 | 1/2006 | Anderson |
| 2006/0021054 A1 | 1/2006 | Costa et al. |
| 2006/0031476 A1 | 2/2006 | Mathes et al. |
| 2006/0047665 A1 | 3/2006 | Neil |
| 2006/0070130 A1 | 3/2006 | Costea et al. |
| 2006/0075496 A1 | 4/2006 | Carpenter et al. |
| 2006/0095968 A1 | 5/2006 | Portolani et al. |
| 2006/0101516 A1 | 5/2006 | Sudaharan et al. |
| 2006/0101517 A1 | 5/2006 | Banzhof et al. |
| 2006/0117385 A1 | 6/2006 | Mester et al. |
| 2006/0123477 A1 | 6/2006 | Raghavan et al. |
| 2006/0143709 A1 | 6/2006 | Brooks et al. |
| 2006/0150249 A1 | 7/2006 | Gassen et al. |
| 2006/0161983 A1 | 7/2006 | Cothrell et al. |
| 2006/0161987 A1 | 7/2006 | Levy-Yurista |
| 2006/0161989 A1 | 7/2006 | Reshef et al. |
| 2006/0164199 A1 | 7/2006 | Gilde et al. |
| 2006/0173992 A1 | 8/2006 | Weber |
| 2006/0179147 A1 | 8/2006 | Tran et al. |
| 2006/0184632 A1 | 8/2006 | Marino et al. |
| 2006/0191010 A1 | 8/2006 | Benjamin |
| 2006/0221956 A1 | 10/2006 | Narayan et al. |
| 2006/0236393 A1 | 10/2006 | Kramer et al. |
| 2006/0242709 A1 | 10/2006 | Seinfeld et al. |
| 2006/0251104 A1 | 11/2006 | Koga |
| 2006/0288417 A1 | 12/2006 | Bookbinder et al. |
| 2007/0006288 A1 | 1/2007 | Mayfield et al. |
| 2007/0006313 A1 | 1/2007 | Porras et al. |
| 2007/0011174 A1 | 1/2007 | Takaragi et al. |
| 2007/0016951 A1 | 1/2007 | Piccard et al. |
| 2007/0033645 A1 | 2/2007 | Jones |
| 2007/0038943 A1 | 2/2007 | FitzGerald et al. |
| 2007/0064689 A1 | 3/2007 | Shin et al. |
| 2007/0094730 A1 | 4/2007 | Bhikkaji et al. |
| 2007/0143827 A1 | 6/2007 | Nicodemus et al. |
| 2007/0156895 A1 | 7/2007 | Vuong |
| 2007/0157180 A1 | 7/2007 | Tillmann et al. |
| 2007/0157306 A1 | 7/2007 | Elrod et al. |
| 2007/0171824 A1 | 7/2007 | Ruello |
| 2007/0174915 A1 | 7/2007 | Gribble et al. |
| 2007/0192500 A1 | 8/2007 | Lum |
| 2007/0192858 A1 | 8/2007 | Lum |
| 2007/0198275 A1 | 8/2007 | Malden et al. |
| 2007/0240218 A1 | 10/2007 | Tuvell et al. |
| 2007/0240219 A1 | 10/2007 | Tuvell et al. |
| 2007/0240220 A1 | 10/2007 | Tuvell et al. |
| 2007/0240222 A1 | 10/2007 | Tuvell et al. |
| 2007/0250930 A1 | 10/2007 | Aziz et al. |
| 2007/0271446 A1 | 11/2007 | Nakamura |
| 2008/0005782 A1 | 1/2008 | Aziz |
| 2008/0028463 A1* | 1/2008 | Dagon ............ H04L 29/12066 726/22 |
| 2008/0072326 A1 | 3/2008 | Danford et al. |
| 2008/0077793 A1 | 3/2008 | Tan et al. |
| 2008/0080518 A1 | 4/2008 | Hoeflin et al. |
| 2008/0098476 A1 | 4/2008 | Syversen |
| 2008/0120722 A1 | 5/2008 | Sima |
| 2008/0134178 A1 | 6/2008 | Fitzgerald et al. |
| 2008/0134334 A1 | 6/2008 | Kim et al. |
| 2008/0141376 A1 | 6/2008 | Clausen et al. |
| 2008/0184373 A1 | 7/2008 | Traut et al. |
| 2008/0189787 A1 | 8/2008 | Arnold et al. |
| 2008/0215742 A1 | 9/2008 | Goldszmidt et al. |
| 2008/0222729 A1 | 9/2008 | Chen et al. |
| 2008/0263665 A1 | 10/2008 | Ma et al. |
| 2008/0295172 A1 | 11/2008 | Bohacek |
| 2008/0301810 A1 | 12/2008 | Lehane et al. |
| 2008/0307524 A1 | 12/2008 | Singh et al. |
| 2008/0320594 A1 | 12/2008 | Jiang |
| 2009/0007100 A1 | 1/2009 | Field |
| 2009/0013408 A1 | 1/2009 | Schipka |
| 2009/0031423 A1 | 1/2009 | Liu et al. |
| 2009/0036111 A1 | 2/2009 | Danford et al. |
| 2009/0044024 A1 | 2/2009 | Oberheide et al. |
| 2009/0044274 A1 | 2/2009 | Budko |
| 2009/0083369 A1 | 3/2009 | Marmor |
| 2009/0083855 A1 | 3/2009 | Apap et al. |
| 2009/0089879 A1 | 4/2009 | Wang et al. |
| 2009/0094697 A1 | 4/2009 | Provos et al. |
| 2009/0109973 A1 | 4/2009 | Ilnicki |
| 2009/0125976 A1 | 5/2009 | Wassermann et al. |
| 2009/0126015 A1 | 5/2009 | Monastyrsky et al. |
| 2009/0126016 A1 | 5/2009 | Sobko et al. |
| 2009/0133125 A1 | 5/2009 | Choi et al. |
| 2009/0158430 A1 | 6/2009 | Borders |
| 2009/0187992 A1 | 7/2009 | Poston |
| 2009/0193293 A1 | 7/2009 | Stolfo et al. |
| 2009/0199296 A1 | 8/2009 | Xie et al. |
| 2009/0228233 A1 | 9/2009 | Anderson et al. |
| 2009/0241187 A1 | 9/2009 | Troyansky |
| 2009/0241190 A1 | 9/2009 | Todd et al. |
| 2009/0265692 A1 | 10/2009 | Godefroid et al. |
| 2009/0271867 A1 | 10/2009 | Zhang |
| 2009/0300761 A1 | 12/2009 | Park et al. |
| 2009/0328185 A1 | 12/2009 | Berg et al. |
| 2009/0328221 A1 | 12/2009 | Blumfield et al. |
| 2010/0017546 A1 | 1/2010 | Poo et al. |
| 2010/0043073 A1 | 2/2010 | Kuwamura |
| 2010/0054278 A1 | 3/2010 | Stolfo et al. |
| 2010/0058474 A1 | 3/2010 | Hicks |
| 2010/0064044 A1 | 3/2010 | Nonoyama |
| 2010/0077481 A1 | 3/2010 | Polyakov et al. |
| 2010/0083376 A1 | 4/2010 | Pereira et al. |
| 2010/0115621 A1 | 5/2010 | Staniford et al. |

(56) References Cited

U.S. PATENT DOCUMENTS

| | | |
|---|---|---|
| 2010/0132038 A1 | 5/2010 | Zaitsev |
| 2010/0154056 A1 | 6/2010 | Smith et al. |
| 2010/0192223 A1 | 7/2010 | Ismael et al. |
| 2010/0251104 A1 | 9/2010 | Massand |
| 2010/0281102 A1 | 11/2010 | Chinta et al. |
| 2010/0281541 A1 | 11/2010 | Stolfo et al. |
| 2010/0281542 A1 | 11/2010 | Stolfo et al. |
| 2010/0287260 A1 | 11/2010 | Peterson et al. |
| 2011/0025504 A1 | 2/2011 | Lyon et al. |
| 2011/0041179 A1 | 2/2011 | St Hlberg |
| 2011/0047594 A1 | 2/2011 | Mahaffey et al. |
| 2011/0047620 A1 | 2/2011 | Mahaffey et al. |
| 2011/0078794 A1 | 3/2011 | Manni et al. |
| 2011/0093951 A1 | 4/2011 | Aziz |
| 2011/0099633 A1 | 4/2011 | Aziz |
| 2011/0113231 A1 | 5/2011 | Kaminsky |
| 2011/0145920 A1 | 6/2011 | Mahaffey et al. |
| 2011/0167494 A1 | 7/2011 | Bowen et al. |
| 2011/0247072 A1 | 10/2011 | Staniford et al. |
| 2011/0265182 A1 | 10/2011 | Peinado et al. |
| 2011/0307954 A1 | 12/2011 | Melnik et al. |
| 2011/0307955 A1 | 12/2011 | Kaplan et al. |
| 2011/0307956 A1 | 12/2011 | Yermakov et al. |
| 2011/0314546 A1 | 12/2011 | Aziz et al. |
| 2012/0079596 A1 | 3/2012 | Thomas et al. |
| 2012/0084859 A1 | 4/2012 | Radinsky et al. |
| 2012/0117652 A1 | 5/2012 | Manni et al. |
| 2012/0174186 A1 | 7/2012 | Aziz et al. |
| 2012/0174218 A1 | 7/2012 | McCoy et al. |
| 2012/0198279 A1 | 8/2012 | Schroeder |
| 2012/0210423 A1 | 8/2012 | Friedrichs et al. |
| 2012/0222121 A1 | 8/2012 | Staniford et al. |
| 2012/0278886 A1 | 11/2012 | Luna |
| 2012/0297489 A1 | 11/2012 | Dequevy |
| 2012/0330801 A1 | 12/2012 | McDougal et al. |
| 2013/0036472 A1 | 2/2013 | Aziz |
| 2013/0047257 A1 | 2/2013 | Aziz |
| 2013/0097706 A1 | 4/2013 | Titonis et al. |
| 2013/0160130 A1 | 6/2013 | Mendelev et al. |
| 2013/0160131 A1 | 6/2013 | Madou et al. |
| 2013/0227691 A1 | 8/2013 | Aziz et al. |
| 2013/0246370 A1 | 9/2013 | Bartram et al. |
| 2013/0263260 A1 | 10/2013 | Mahaffey et al. |
| 2013/0291109 A1 | 10/2013 | Staniford et al. |
| 2013/0298243 A1 | 11/2013 | Kumar et al. |
| 2014/0007238 A1 | 1/2014 | Magee et al. |
| 2014/0053260 A1 | 2/2014 | Gupta et al. |
| 2014/0053261 A1 | 2/2014 | Gupta et al. |

FOREIGN PATENT DOCUMENTS

| | | |
|---|---|---|
| WO | 02/23805 A2 | 3/2002 |
| WO | 2007117636 A2 | 10/2007 |
| WO | 2008041950 A2 | 4/2008 |
| WO | 2011084431 A2 | 7/2011 |
| WO | 2012145066 A1 | 10/2012 |

OTHER PUBLICATIONS

"Network Security: NetDetector—Network Intrusion Forensic System (NIFS) Whitepaper", ("NetDetector Whitepaper"), (2003).

"Packet", Microsoft Computer Dictionary, Microsoft Press, (Mar. 2002), 1 page.

"When Virtual is Better Than Real", IEEEXplore Digital Library, available at, http://ieeexplore.ieee.org/xpl/articleDetails.isp?reload=true&arnumbe- r=990073, (Dec. 7, 2013).

Abdullah, et al., Visualizing Network Data for Intrusion Detection, 2005 IEEE Workshop on Information Assurance and Security, pp. 100-108.

Adetoye, Adedayo , et al., "Network Intrusion Detection & Response System", ("Adetoye"), (Sep. 2003).

AltaVista Advanced Search Results. "attack vector identifier". Http://www.altavista.com/web/results?Itag=ody&pg=aq &aqmode=aqa=Event+Orch- estrator . . . , (Accessed on Sep. 15, 2009).

AltaVista Advanced Search Results. "Event Orchestrator". Http://www.altavista.com/web/results?Itag=ody&pg=aq &aqmode=aqa=Event+Orch- esrator . . . , (Accessed on Sep. 3, 2009).

Aura, Tuomas, "Scanning electronic documents for personally identifiable information", Proceedings of the 5th ACM workshop on Privacy in electronic society. ACM, 2006.

Baecher, "The Nepenthes Platform: An Efficient Approach to collect Malware", Springer-verlag Berlin Heidelberg, (2006), pp. 165-184.

Bayer, et al., "Dynamic Analysis of Malicious Code", J Comput Virol, Springer-Verlag, France., (2006), pp. 67-77.

Boubalos, Chris , "extracting syslog data out of raw pcap dumps, seclists.org, Honeypots mailing list archives", available at http://seclists.org/honeypots/2003/g2/319 ("Boubalos"), (Jun. 5, 2003).

Chaudet, C. , et al., "Optimal Positioning of Active and Passive Monitoring Devices", International Conference on Emerging Networking Experiments and Technologies, Proceedings of the 2005 ACM Conference on Emerging Network Experiment and Technology, CoNEXT '05, Toulousse, France, (Oct. 2005), pp. 71-82.

Chen, P. M. and Noble, B. D., "When Virtual is Better Than Real, Department of Electrical Engineering and Computer Science", University of Michigan ("Chen") (2001).

Cisco, Configuring the Catalyst Switched Port Analyzer (SPAN) ("Cisco"), (1992).

Cohen, M.I. , "PyFlag—An advanced network forensic framework", Digital investigation 5, Elsevier, (2008), pp. S112-S120.

Costa, M. , et al., "Vigilante: End-to-End Containment of Internet Worms", SOSP '05, Association for Computing Machinery, Inc., Brighton U.K., (Oct. 23-26, 2005).

Crandall, J.R. , et al., "Minos:Control Data Attack Prevention Orthogonal to Memory Model", 37th International Symposium on Microarchitecture, Portland, Oregon, (Dec. 2004).

Deutsch, P. , "Zlib compressed data format specification version 13" RFC 1950, (1996).

Distler, "Malware Analysis: An Introduction", SANS Institute InfoSec Reading Room, SANS Institute, (2007).

Dunlap, George W. , et al., "ReVirt: Enabling Intrusion Analysis through Virtual-Machine Logging and Replay", Proceeding of the 5th Symposium on Operating Systems Design and Implementation, USENIX Association, ("Dunlap"), (Dec. 9, 2002).

Excerpt regarding First Printing Date for Merike Kaeo, Designing Network Security ("Kaeo"), (2005).

Filiol, Eric , et al., "Combinatorial Optimisation of Worm Propagation on an Unknown Network", International Journal of Computer Science 2.2 (2007).

Goel, et al., Reconstructing System State for Intrusion Analysis, Apr. 2008 SIGOPS Operating Systems Review, vol. 42 Issue 3, pp. 21-28.

Hjelmvik, Erik , "Passive Network Security Analysis with NetworkMiner", (IN)Secure, Issue 18, (Oct. 2008), pp. 1-100.

IEEE Xplore Digital Library Sear Results for "detection of unknown computer worms". Http//ieeexplore.ieee.org/searchresult.jsp?SortField=Score&SortOrder=desc- &ResultC . . . , (Accessed on Aug. 28, 2009).

Kaeo, Merike , "Designing Network Security", ("Kaeo"), (Nov. 2003).

Kim, H. , et al., "Autograph: Toward Automated, Distributed Worm Signature Detection", Proceedings of the 13th Usenix Security Symposium (Security 2004), San Diego, (Aug. 2004), pp. 271-286.

King, Samuel T., et al., "Operating System Support for Virtual Machines", ("King") (2003).

Krasnyansky, Max , et al., Universal TUN/TAP driver, available at https://www.kernel.org/doc/Documentation/networking/tuntap.txt (2002) ("Krasnyansky").

Kreibich, C. , et al., "Honeycomb-Creating Intrusion Detection Signatures Using Honeypots", 2nd Workshop on Hot Topics in Networks (HotNets-11), Boston, USA, (2003).

Kristoff, J. , "Botnets, Detection and Mitigation: DNS-Based Techniques", NU Security Day, (2005), 23 pages.

(56) References Cited

OTHER PUBLICATIONS

Liljenstam, Michael, et al., "Simulating Realistic Network Traffic for Worm Warning System Design and Testing", Institute for Security Technology studies, Dartmouth College ("Liljenstam"), (Oct. 27, 2003).

Marchette, David J., "Computer Intrusion Detection and Network Monitoring: A Statistical Viewpoint", ("Marchette"), (2001).

Margolis, P.E., "Random House Webster's 'Computer & Internet Dictionary 3rd Edition'", ISBN 0375703519, (Dec. 1998).

Moore, D., et al., "Internet Quarantine: Requirements for Containing Self-Propagating Code", INFOCOM, vol. 3, (Mar. 30-Apr. 3, 2003), pp. 1901-1910.

Morales, Jose A., et al., ""Analyzing and exploiting network behaviors of malware."", Security and Privacy in communication Networks. Springer Berlin Heidelberg, 2010. 20-34.

Natvig, Kurt, "SANDBOXII: Internet", Virus Bulletin Conference, ("Natvig"), (Sep. 2002).

NetBIOS Working Group. Protocol Standard for a NetBIOS Service on a TCP/UDP transport: Concepts and Methods. STD 19, RFC 1001, Mar. 1987.

Newsome, J., et al., "Dynamic Taint Analysis for Automatic Detection, Analysis, and Signature Generation of Exploits on Commodity Software", In Proceedings of the 12th Annual Network and Distributed System Security, Symposium (NDSS '05), (Feb. 2005).

Newsome, J., et al., "Polygraph: Automatically Generating Signatures for Polymorphic Worms", In Proceedings of the IEEE Symposium on Security and Privacy, (May 2005).

Nojiri, D., et al., "Cooperation Response Strategies for Large Scale Attack Mitigation", DARPA Information Survivability Conference and Exposition, vol. 1, (Apr. 22-24, 2003), pp. 293-302.

Reiner Sailer, Enriquillo Valdez, Trent Jaeger, Roonald Perez, Leendert van Doom, John Linwood Griffin, Stefan Berger., sHype: Secure Hypervisor Appraoch to Trusted Virtualized Systems (Feb. 2, 2005) ("Sailer").

Silicon Defense, "Worm Containment in the Internal Network", (Mar. 2003), pp. 1-25.

Singh, S., et al., "Automated Worm Fingerprinting", Proceedings of the ACM/USENIX Symposium on Operating System Design and Implementation, San Francisco, California, (Dec. 2004).

Spitzner, Lance, "Honeypots: Tracking Hackers", ("Spizner"), (Sep. 17, 2002).

The Sniffers's Guide to Raw Traffic available at: yuba.stanford. edu/.about.casado/pcap/section1.html, (Jan. 6, 2014).

Thomas H. Ptacek, and Timothy N. Newsham, "Insertion, Evasion, and Denial of Service: Eluding Network Intrusion Detection", Secure Networks, ("Ptacek"), (Jan. 1998).

U.S. Appl. No. 13/895,271, filed May 15, 2013 Final Office Action dated Jun. 11, 2015.

U.S. Appl. No. 13/895,271, filed May 15, 2013 Non-Final Office Action dated May 24, 2016.

U.S. Appl. No. 13/895,271, filed May 15, 2013 Non-Final Office Action dated Nov. 24, 2014.

U.S. Appl. No. 13/895,271, filed May 15, 2013 Non-Final Office Action dated Sep. 25, 2015.

U.S. Appl. No. 13/895,271, filed May 15, 2013 Notice of Allowance dated Dec. 14, 2016.

Venezia, Paul, "NetDetector Captures Intrusions", InfoWorld Issue 27, ("Venezia"), (Jul. 14, 2003).

Whyte, et al., "DNS-Based Detection of Scanning Works in an Enterprise Network", Proceedings of the 12th Annual Network and Distributed System Security Symposium, (Feb. 2005), 15 pages.

Williamson, Matthew M., "Throttling Viruses: Restricting Propagation to Defeat Malicious Mobile Code", ACSAC Conference, Las Vegas, NV, USA, (Dec. 2002), pp. 1-9.

\* cited by examiner

Pre-Processor

Pre-Processing

Recommender

Recommending

Supplemental Indicator Generator

Classifier

Classifying

Naming

SYSTEM AND METHOD FOR DETECTING MALICIOUS ACTIVITY AND CLASSIFYING A NETWORK COMMUNICATION BASED ON DIFFERENT INDICATOR TYPES

CROSS-REFERENCE TO RELATED APPLICATIONS

This application is a continuation application of U.S. patent application Ser. No. 13/895,271, now U.S. Pat. No. 9,635,039, the entire contents of which are incorporated by reference herein.

BACKGROUND

Field of the Invention

The present invention relates generally to network security and more particularly to detecting malicious software operating in computers and other digital devices.

Related Art

Malicious software, or malware for short, may include any program or file that is harmful by design to a computer. Malware includes computer viruses, worms, Trojan horses, adware, spyware, and any programming that gathers information about a computer or its user or otherwise operates without permission. The owners of the computers are often unaware that these programs have been added to their computers and are often similarly unaware of their function.

Malicious network content is a type of malware distributed over a network via Web sites, e.g., servers operating on a network according to an HTTP standard or other well-known standard. Malicious network content distributed in this manner may be actively downloaded and installed on a computer, without the approval or knowledge of its user, simply by the computer accessing the Web site hosting the malicious network content (the "malicious Web site"). Malicious network content may be embedded within objects associated with Web pages hosted by the malicious Web site. Malicious network content may also enter a computer on receipt or opening of email. For example, email may contain an attachment, such as a PDF document, with embedded malicious executable programs. Furthermore, malicious content may exist in files contained in a computer memory or storage device, having infected those files through any of a variety of attack vectors.

Various processes and devices have been employed to prevent the problems associated with malicious content. For example, computers often run antivirus scanning software that scans a particular computer for viruses and other forms of malware. The scanning typically involves automatic detection of a match between content stored on the computer (or attached media) and a library or database of signatures of known malware. The scanning may be initiated manually or based on a schedule specified by a user or system administrator associated with the particular computer. Unfortunately, by the time malware is detected by the scanning software, some damage on the computer or loss of privacy may have already occurred, and the malware may have propagated from the infected computer to other computers. Additionally, it may take days or weeks for new signatures to be manually created, the scanning signature library updated and received for use by the scanning software, and the new signatures employed in new scans.

Moreover, anti-virus scanning utilities may have limited effectiveness to protect against all exploits by polymorphic malware. Polymorphic malware has the capability to mutate to defeat the signature match process while keeping its original malicious capabilities intact. Signatures generated to identify one form of a polymorphic virus may not match against a mutated form. Thus polymorphic malware is often referred to as a family of virus rather than a single virus, and improved anti-virus techniques to identify such malware families is desirable.

Another type of malware detection solution employs virtual environments to replay content within a sandbox established by virtual machines (VMs) that simulates or mimics a target operating environment. Such solutions monitor the behavior of content during execution to detect anomalies and other activity that may signal the presence of malware. One such system sold by FireEye, Inc., the assignee of the present patent application, employs a two-phase malware detection approach to detect malware contained in network traffic monitored in real-time. In a first or "static" phase, a heuristic is applied to network traffic to identify and filter packets that appear suspicious in that they exhibit characteristics associated with malware. In a second or "dynamic" phase, the suspicious packets (and typically only the suspicious packets) are replayed within one or more virtual machines. For example, if a user is trying to download a file over a network, the file is extracted from the network traffic and analyzed in the virtual machine using an instance of a browser to load the suspicious packets. The results of the analysis constitute monitored behaviors of the suspicious packets, which may indicate that the file should be declared malicious. The two-phase malware detection solution may detect numerous types of malware and, even malware missed by other commercially available approaches. Through its dynamic execution technique, the two-phase malware detection solution may also achieve a significant reduction of false positives relative to such other commercially available approaches. Otherwise, dealing with a large number of false positives in malware detection may needlessly slow or interfere with download of network content or receipt of email, for example. This two-phase approach has even proven successful against many types of polymorphic malware and other forms of advanced persistent threats.

In some instances, malware may take the form of a "bot," a contraction for software robot. Commonly, in this context, a bot is configured to control activities of a digital device (e.g., a computer) without authorization by the digital device's user. Bot-related activities include bot propagation to attack other computers on a network. Bots commonly propagate by scanning nodes (e.g., computers or other digital devices) available on a network to search for a vulnerable target. When a vulnerable computer is found, the bot may install a copy of itself, and then continue to seek other computers on a network to infect.

A bot may, without the knowledge or authority of the infected computer's user, establish a command and control (CnC) communication channel to send outbound communicates to its master (e.g., a hacker or herder) or a designated surrogate and to receive instructions back. Often the CnC communications are sent over the Internet, and so comply with the Hypertext Transfer Protocol (HTTP) protocol. Bots may receive CnC communication from a centralized bot server or another infected computer (peer to peer). The outbound communications over the CnC channel are often referred to as "callbacks," and may signify that bots are installed and ready to act. Inbound CnC communications may contain instructions directing the bot to cause the infected computers (i.e., zombies) to participate in organized attacks against one or more computers on a network. For example, bot-infected computers may be directed to ping another computer on a network, such as a bank or government agency, in a denial-of-service attack, often referred to as a distributed denial-of-service attack (DDoS). In other examples, upon receiving instructions, a bot may (a) direct an infected computer to transmit spam across a network; (b) transmit information regarding or stored on the infected host computer; (c) act as a keylogger and record keystrokes on the infected host computer, or (d) search for personal information (such as email addresses contained in an email or a contacts file). This information may be transmitted to one or more other infected computers to the bot's master.

Further enhancement to effective detection of malware callbacks while avoiding false positives is desirable of course, particularly as malware developers continue to create new exploits, including more sophisticated bots and botnets, having potentially serious consequences.

SUMMARY

Techniques may automatically detect bots or botnets running in a computer or other digital device by detecting command and control communications, called "call-backs," from malicious code that has previously gained entry into the digital device. Callbacks are detected using an approach employing both a set of high quality indicators and a set of supplemental indicators. The high quality indicators are selected since they provide a strong correlation with callbacks, and may be sufficient for the techniques to determine that the network outbound communications actually constitute callbacks. If not, the supplemental indicators may be used in conjunction with the high quality indicators to declare the outbound communications as callbacks.

Detecting callbacks as described herein as a keystone of malicious attack and exploit analysis may permit embodiments of the invention to detect disparate forms of malware, and even families of polymorphic virus that use the same communication mechanisms to obtain instructions and other communications in furtherance of their nefarious purposes.

BRIEF DESCRIPTION OF THE DRAWINGS

The invention will be more fully understood with reference to the following detailed description in conjunction with the drawings, of which.

DESCRIPTION OF ILLUSTRATIVE EMBODIMENTS

Introduction

Figure 1A:
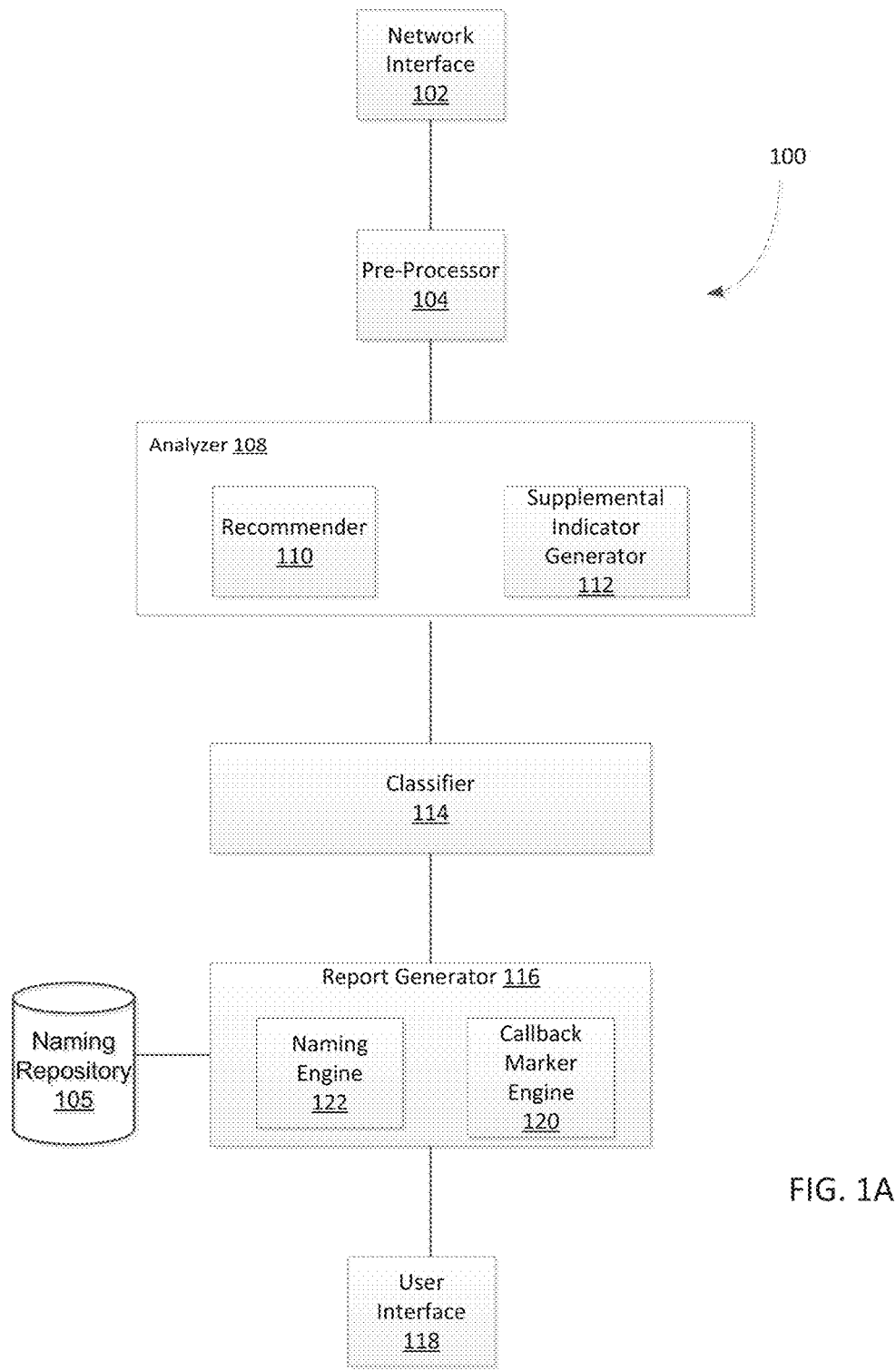
FIG. 1A is an architecture-level block diagram of a callback detection and analysis system, in accordance an illustrative embodiment of the invention.

Generally speaking, a bot is a type of (or part of) an active infiltration attack, often installing or operating in a two-step process. The first step is the initial infection, which may be a typically small package of malicious code (malware) whose function is to compromise the infected device. The second step involves that malware obtaining instructions as to malicious activity it is to perform, including possibly downloading additional malware, e.g., over the Internet or sending messages or data from the infected computer. This second step often involves establishing a CnC channel over which it may send a message providing its status or requesting CnC communications (instructions). This is called a "callback," and the exchange of such communications may be referred to as callback activity.

The CnC may use an undocumented entry point, or subvert and use a documented entry point to request instructions over a CnC channel, which are often transmitted over the same or other channels. Often the CnC channel is established via a non-standard port provided by the operating system of the infected device. In so doing, the bot bypasses normal security and authentication mechanisms, and thereby achieves unauthorized egress from the computer. A hallmark of bots is the manner by which they utilize egress points for callbacks is designed to remain undetected to the digital device's user and system/network administrators.

Embodiments of the invention provide a computer implemented method for detecting callbacks from malicious code in network communications. The method includes generating a set of high quality indicators and a set of supplemental indicators associated with each of the network communications. The high quality indicators have a strong correlation with callbacks, and the supplemental indicators having a lower correlation with callbacks than the high quality indicators. The method also includes classifying each of the network communications as to whether each constitutes a callback using the high quality indicators if sufficient to determine that the associated network communication constitutes a callback, and, otherwise, using the supplemental indicators in conjunction with the high quality indicators.

In some embodiments, the method may be practiced to generate the high quality indicators, which may entail the steps of (i) extracting at least one of a destination URL, destination IP address, and destination domain from each network communication; (ii) determining a reputation indicator associated with each of the at least one destination URL, destination IP address, and destination domain; and, thereupon, (ii) including each of the reputation indicators in the set of high quality indicators used to classify the network communication. For performing the classification, these embodiments may also assign a weight and a score to each of the reputation indicators.

In some embodiments, the method may be practiced to generate the supplemental indicators, which may entail the steps of (i) inspecting packet headers of each of the network communications to identify one or more protocol anomalies; and (ii) evaluating each of the identified protocol anomalies by assigning a weight to each reflecting its correlation with callback activity and non-callback activity, as well as an overall score(s) for the supplemental indicators.

In another aspect of these embodiments, a malware name may be identified and associated with discovered callbacks. This entails forming a malware marker from each network communication constituting a callback; and performing a database look-up using the malware marker to identify a malware name associated therewith. The malware name so identified may (i) have the same malware marker as the callback, in which case these embodiments may declare the callback by that name; (ii) have a high correlation with the malware marker but not the same malware marker, in which case these embodiments may classify the callback as associated with a family related to the malware name; (iii) not have a high correlation with any malware name in the database, in which case these embodiments may declare that a new malware has been discovered.

While the foregoing description pertains to embodiments of the invention practicing a computer implemented method, embodiments may constitute systems, apparatus, or computer program products as well, as will be apparent from the following description.

Throughout this specification, reference is made to HTTP, communications, protocols and protocol anomalies. HTTP is an application layer protocol widely used for data communications for the World Wide Web. The Request for Comment (RFC) 2616: Hypertext Transfer Protocol—HTTP/1.1 specification sets out the semantics and other requirements for HTTP communications. HTTP resources are identified and located on a network by Uniform Resource Locators (URLs). Employing a client-server computing model, HTTP provides data communication for example between one or more Web browsers running on computers or other electronic devices constituting the clients, and an application running on a computer or other electronic device hosting a Web site constituting the server. HTTP is a request-response protocol. For example, a user clicks on a link on their Web browser, which sends a request over the Internet to a web server hosting the Web site identified in the request. The server may then send back a response containing the contents of that site, including perhaps text and images for display by the user's browser.

The HTTP specification defines fields of HTTP headers, which are components of HTTP messages used in both requests and responses, and define the operating parameters of an HTTP communication or transaction. The header fields are transmitted after the request or response line, which is the first line of a message. As noted, the HTTP semantics are well defined, for example: Header fields are colon-separated, name-value pairs in clear-text string format. Each field is terminated by a carriage return (CR) and line feed (LF) character sequence. The end of the header fields is indicated by an empty field, resulting in the transmission of two consecutive CR-LF pairs. Variations from the specified semantics constitute anomalies. Also, the HTTP specification allows users to define their own fields and content, though often practice and convention dictate how those fields are used and what content may be expected. Variations from those conventions may also be deemed anomalies. Finally, sometimes malware authors will insert content into the fields, such as malware names or other tell tail malware descriptors or indicators, which serve as strong evidence of malicious activity. These too will be deemed anomalies for purposes of this specification.

For communication, an HTTP header is added to an HTTP message, and placed in a TCP/UDP message (sometimes more than one TCP/UDP message per HTTP message), which, in turn, is encapsulated (as payload) in an IP Datagram, which is encapsulated (as payload) in a Layer 2 Frame, which is sent as a signal over the transmission medium as a string of binary numbers. Each Layer 2 Frame has, in order, a Layer 2 header, an IP header, a TCP or UDP header, a HTTP header, HTTP data, etc., and finally a Layer 2 footer. Taking this explanation one step further, the IP layer includes in its header the information necessary for the packet to find its way to its final destination. More specifically, for computer-to-computer communication across networks, a source device forms packets for transmission by placing the IP address of the destination computer in the IP header of each packet involved in a communication session. The data packets are encapsulated as noted above and placed on the network and routed across the network to the destination having the specified IP address. In this specification, reference will be made to "packets," which shall be used in a broad sense to include, without limitation, messages, datagrams, frames and, of course, packets, unless the context requires otherwise. Accordingly, packet capture techniques may yield the HTTP header, IP address of the destination of an IP packet as well as domain identifiers from the URL of HTTP headers included in the IP packets.

Callback Detection and Analysis System

FIG. 1A is a block diagram illustrating the general architecture of a callback detection and analysis system 100 in accordance with an illustrative embodiment of the invention. The callback detection and analysis system 100 includes a network interface 102, a pre-processor 104, an analyzer 108, a classifier 114, a report generator 116, and a user interface 118.

The network interface 102 is configured to receive "outbound" communications, such as communications containing HTTP packets, sent from one or more computing devices. The network interface 102 may include a network tap 103 adapted to make a copy of the outbound communications, as further described hereinbelow.

The pre-processor or pre-processing engine 104 is configured to receive the outbound communications, or in some embodiments a copy thereof, and to inspect the outbound communications to determine whether they should be submitted for further analysis by the analyzer 108.

The analyzer or analyzing engine 108 is configured to perform an analysis on the outbound communications received from the pre-processor 104. The analysis may take the form of static analysis, as opposed to dynamic analysis involving execution as may be carried out in a virtual environment as described hereinbelow. The analyzer 108 includes a recommender 110 and a supplemental influencer generator 112. The purpose and operation of these two components will be described at some length.

The classifier or classification engine 114 is configured to receive the results generated by both the recommender 110 and the supplemental influencer generator 112 for the purpose of classifying whether each of the outbound communications constitutes a command and control communication of a malicious nature. The classifier 114 uses both a set of high quality indicators and a set of supplemental indicators for assessing each outbound communication. The high quality indicators provide a strong correlation between outbound communications and callbacks, and may be sufficient for the techniques to determine that the outbound communications constitute callbacks. If not, the supplemental indicators may be used in conjunction with the high quality indicators to declare the outbound communications as callbacks. The classifier assigns scores to the high quality indicators and supplemental indicators, and uses the scores in ascertaining whether to classify each outbound communication as constituting a callback.

The report generator or reporting engine 116 is configured to generate an alert and in some embodiments also a detailed report based on the output results of the analyzer 108 and classifier 114. It also may generate a set of generic indicators (high quality and supplemental) which can be used to detect similar callbacks in future. In some embodiments, the alert and/or report may include a common name or label of a malware identified by the report generator 116. The furnished name is selected based on it having a high correlation with the associated outbound communication. In other words, the outbound communication may have characteristics associated with a known malware, the report generator 116 will discover the known malware name, and the alert and/or report will present its name to guide actions to be taken, e.g., of a remedial nature. In some cases, the callback detection and analysis system 100 will have discovered such a strong correlation with characteristics of a known malware that the communication will be deemed associated with that same malware; and, in other cases, the callback detection and analysis system 100 will have discovered a sufficiently high correlation with the known malware that the communication will be deemed a member of the same family as the named malware.

The user interface 118 is configured for providing the alert and/or report from the report generator 116, e.g., to a user or administrator. The administrator may be a network administrator or a security operations technician responsible for dealing with exploits.

Figure 1B:
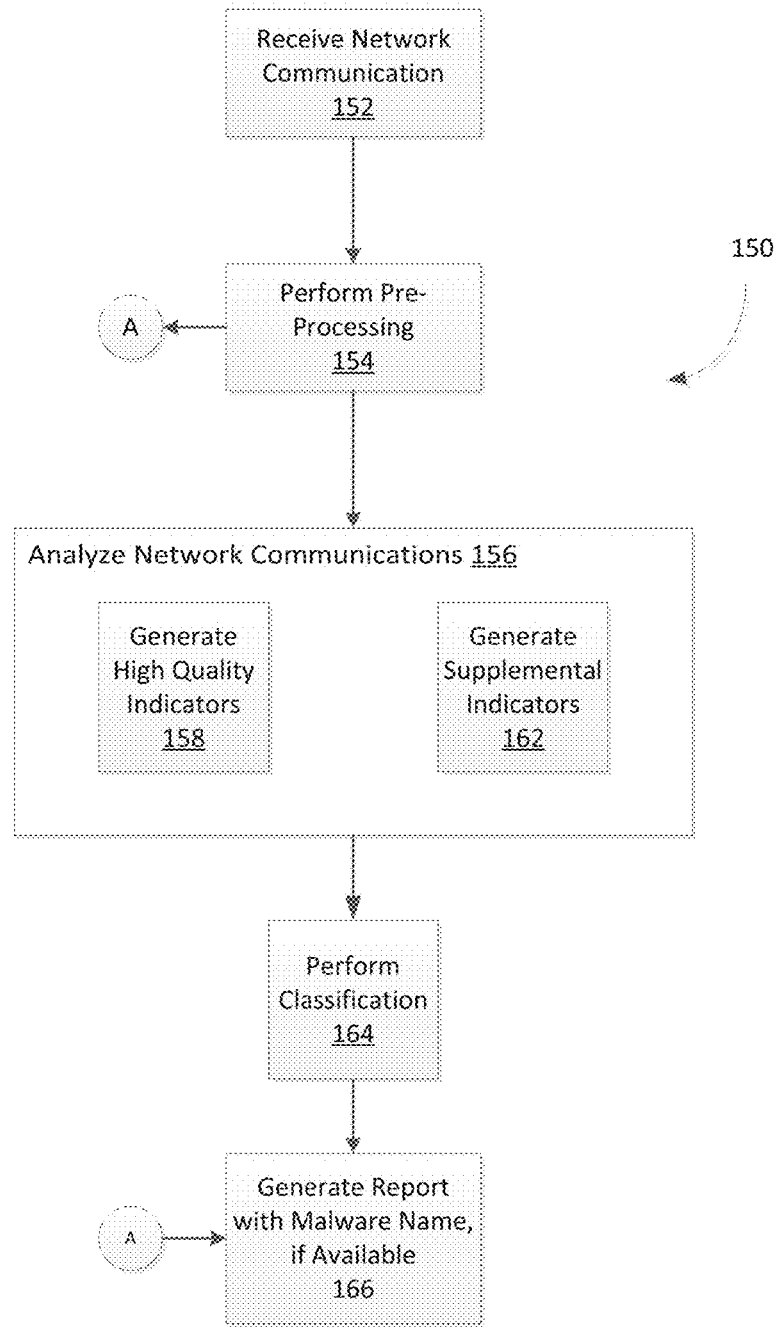
FIG. 1B is a flow chart of a method for detecting and analyzing callbacks in accordance with an illustrative embodiment of the invention, as may be implemented by the system of FIG. 1A.

FIG. 1B is a flowchart of a method 150 of operating the callback detection system 100 of FIG. 1A in accordance with an illustrative embodiment of the invention. In block 152, logic receives outbound communications, for example at a network interface 102. In step 154, logic performs pre-filtering on the received outbound communications. In block 156, logic analyzes the outbound communications as furnished by the pre-filtering step 154. The analysis may include generating high quality indicators in step 158 as well as supplemental indicators in step 162.

High quality indicators represent features or characteristics of the outbound communications that have high probative value in classifying whether the outbound communications are command and control communications. Consequently, when identified for the outbound communications, the high quality indicators have a high correlation with those associated with command and control communications. For example, the high quality indicators may include negative reputation of the domains, URLs, or IP addresses associated with the outbound communications.

Supplemental indicators represent features or characteristics of the outbound communications that have lower probative value (compared with the high quality indicators) in classifying whether the outbound communications are command and control communications. Consequently, when identified for the outbound communications, the supplemental indicators have lower (though positive) correlations with those associated with command and control communications. For example, the supplemental indicators may include select protocol anomalies in the outbound communications.

Returning to FIG. 1B, in step 164, logic performs a classification on the outbound communications based on the high quality indicators and the supplemental indicators identified by the analyzing step 156.

Then, in step 166, logic generates an alert and/or report providing details regarding the outbound communications, including whether the outbound communications constitute command and control communications associated with malware. In some cases, the alert and/or report may also provide a name or label associated with the malware.

The description of embodiments of the invention will next deal with certain terms of art, for which a short digression may aid understanding. As is well known in the art, the term "domain" or "domain name" refers to a collection or string of characters that uniquely signify a domain within the Internet. A domain name is a significant part of a URL (short for "Uniform Resource Locator), an Internet address used by Web browsers to locate a resource on the Internet. The resource can be any type of file stored on a server, such as a Web page, a text file, a graphics file, a video file or an application program.

As is also well known, a URL contains at least three elements: (i) the type of protocol used to access the file (e.g., HTTP for a Web page); the domain name or IP address of the server where the file resides; and, optionally, the pathname to the file (i.e., a description of the file's location). For example, the URL given by http: //www.acme.com/patent instructs a browser to use the HTTP protocol, go to the "www.acme.abc.com" web server to access the file named "patent". The domain name itself is structured hierarchically, with the top level domain (or "TLD") in this example being ".com". Other commonly used TLDs include .net and .org. In addition to these, there are TLDs for countries such as .US, .AU and .UK. There are also TLDs for schools, the military and government agencies, namely, .edu, .mil - and .gov. The term "Second level domain" refers to the string immediately to the left of that dot. In the above example, the second level domain is "acme". Third level domain in this example refers to "www". Often, the domain names will specify well-known company names; or perhaps it is better described as domains encapsulate or refer to host names, and the host names often correspond to company names. Consider the example: www. google.com. The second level domain here is "google", a domain registration currently owned by Google, Inc. Consequently, as can be understood from the above examples, a URL can usually be parsed to indicate at least some of the following: a host name, a host's IP address, a country, a company name and an organization's name.

Figure 2A:
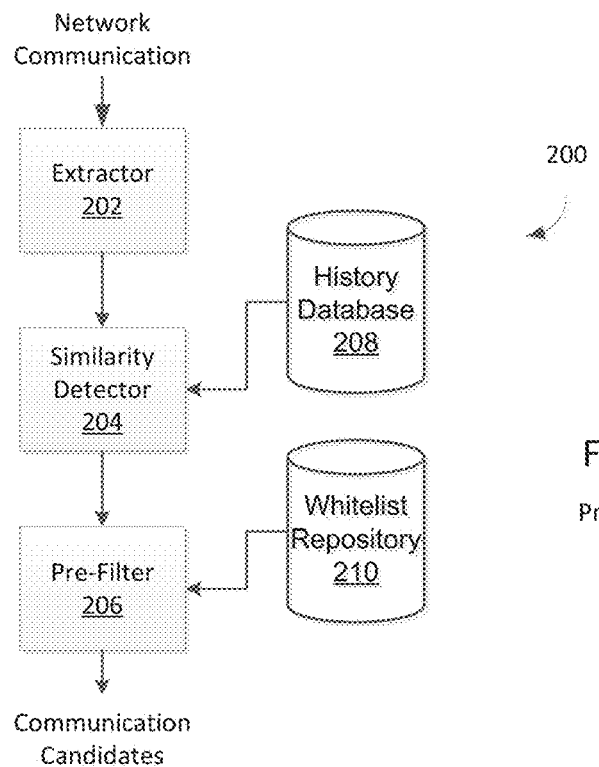
FIG. 2A is a block diagram of the pre-processor of FIG. 1A, in accordance with an illustrative embodiment of the invention.

Returning to the figures, FIG. 2A is a block diagram depicting a pre-processor 200 in accordance with an illustrative embodiment of the invention. The pre-processor 200 has an extractor 202, similarity detector 204, and pre-filter 206. The extractor 202 is configured to receive outbound communications, for example, from the network interface 102 of FIG. 1A, and to parse the packets of the outbound communication to extract select component parts thereof (sometimes referred to as "factors") used in the analysis and naming aspects of the embodiments described herein. The factors may include a domain name, a URL, a host IP address, user-agent, and/or URI parameters, among others.

The similarity detector 204 (sometimes referred to as a duplicity checker) is configured to determine whether the callback detecting and analyzing system 100 (FIG. 1) has previously analyzed the same outbound communications. The similarity detector 204 may perform this for each outbound communication by forming a hash (pursuant to a hash algorithm, such as Md5, as is known is the art) from select factors to identify the header of the communication, performing a look-up of the hash in a database of hashes identifying previously analyzed outbound communications, as provided, for example, in repository 208. The database of repository 208 may also contain the results of analysis of such communications. If the outbound communication currently being scrutinized is found in (that is, matches an entry in) the repository 208, and the entry identifies the corresponding outbound communication as constituting a command and control communication, this result is reported in step 166 (FIG. 1B, as illustrated at arrow "A") and no further analysis of that communication is required. Of course, in some cases, it may be desirable to continue to analyze even such communications so as to acquire additional intelligence regarding the malware.

The pre-filter or pre-filtering engine 206 is configured to obtain the domain name from the outbound communication, to access a database stored in repository 210 of "whitelisted" domains and determine whether the domain of the current outbound communication matches any of the entries of whitelisted domains. The whitelist of domains is a collection of domains believed to be "safe," i.e., free of malware. Safe domains may include those of well-known companies, organizations, schools, and government agencies and departments. Lists of such safe domains are commercially available, publically available on the Internet, or may be compiled for these purposes through various means.

The pre-processor 200 generates communication candidates deserving of further analysis. Those that have already been processed in earlier testing and found to be either malware or safe, as determined by the similarity detector 204, need not be further analyzed. Similarly, those that correspond to any of the whitelisted domains, as determined by the pre-filter 206, need not be further analyzed.

Figure 2B:
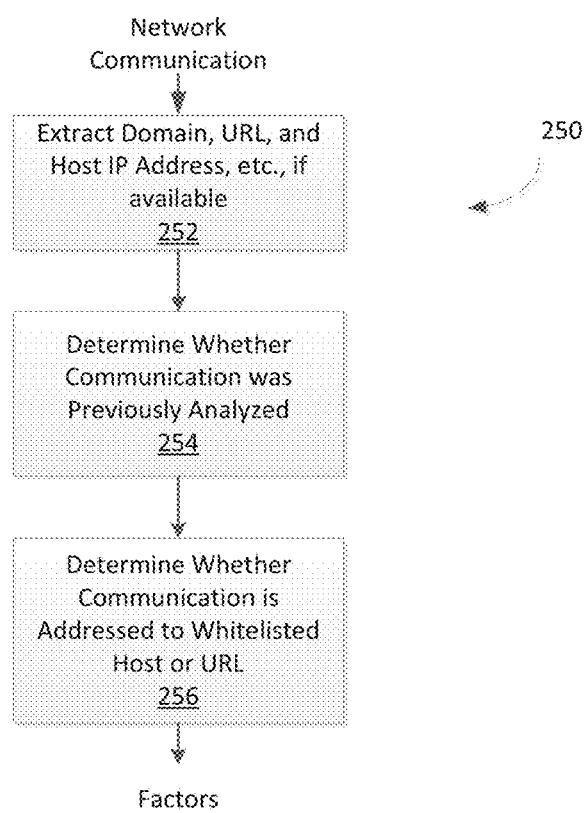
FIG. 2B is a flow chart of a method of pre-processing received communications, in accordance with an illustrative embodiment of the invention, as may be implemented by the pre-processor of FIG. 2A.

FIG. 2B is a flowchart of a method 250 of operating the pre-processor 200 of FIG. 2A in accordance with an illustrative embodiment of the invention. In block 252, logic extracts the domain, URL, host IP address, and other protocol headers from the outbound communication. In block 254, logic determines whether the outbound communication was previously analyzed and thus is a duplicate of an earlier received communication. As noted above, this can be performed through a database lookup, for example, where the database is stored locally in a repository and updated for each communication processed by the callback detection and analysis system 100 (FIG. 1A). The local repository can be updated with information from a geographically remote database containing the results of callback analysis from a number of other callback detection and analysis systems, as will be described herein below. As noted above, this can be performed by comparing a hash based on the current communication with entries in the "history" database of prior communications already analyzed. The foregoing step is referred to herein as similarity detecting. In step 256, logic determines whether the outbound communication is addressed to a whitelisted or "safe" host or URL. This is referred to herein as "pre-filtering". The pre-filtering may be invoked after the similarity detecting, as illustrated and described, or these two steps may be performed in reverse order.

Figure 3A:
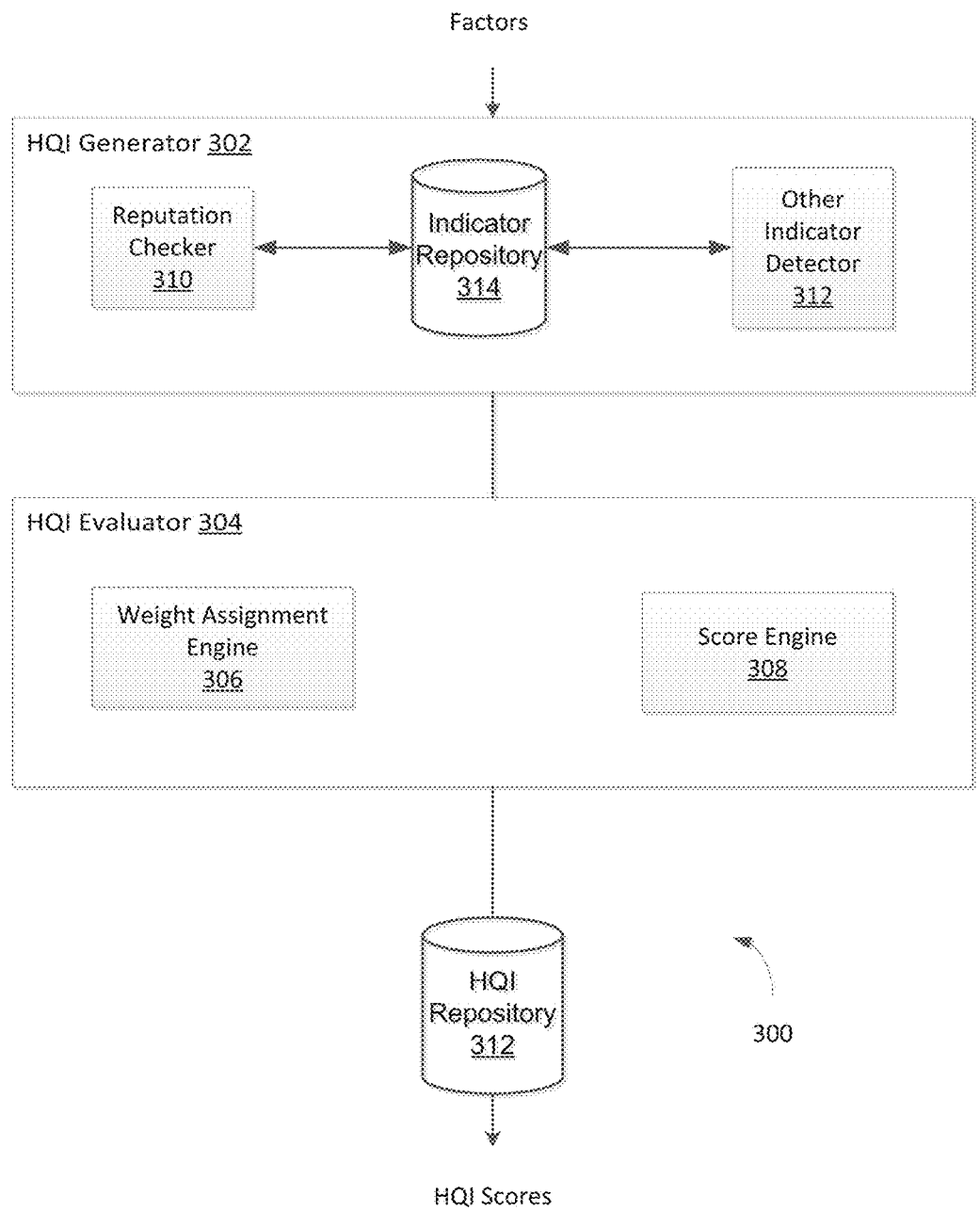
FIG. 3A is a block diagram of the recommender of FIG. 1A, in accordance with an illustrative embodiment of the invention.

FIG. 3A is a block diagram depicting a recommender 300 in accordance with an illustrative embodiment of the invention. The recommender 300 has a high quality indicator (HQI) generator 302, a HQI evaluator 304, and a HQI repository 306.

The HQI generator 302 is configured to select and store indicators discovered in the outbound communications under test having a high correlation with command and control communications. The HQI generator 302 includes a reputation checker 310, an "other" strong indicator (OSI) detector 312, and an indicator repository 314. The reputation checker 310 is configured to check the reputation of, e.g., the domain, IP address, or URL, or a combination of two or more of the foregoing, as extracted by the extractor 202 (FIG. 2A) from the packet headers included in the outbound communications. The reputation of the domain, IP address, and/or URL may be a strong indication that the outbound communication is or is not a callback. The reputation checker 310 may check for the reputation by looking up the factors in the indicator repository 314, which contains a database of information providing the reputation for a plurality of factors. For example, if the domain name is "google.com," the database may indicate a strong favorable reputation associated with Google, Inc. The OSI detector 312 will perform a similar check with respect to any of a variety of other indicators that may provide a high correlation to callback or non-callback communications. These shall be discussed shortly.

The HQI evaluator or evaluation engine 304 is configured to assign weights and scores to the discovered HQI, and pass the scores to the classifier 114 (FIG. 1A). The HQI evaluator 304 includes a weight assignment engine 306 and a scoring engine 308. The weight assignment engine 306 is configured to assign a weight to each of the discovered HQI in accordance with its perceived correlation with callbacks. The weights may be, for example, an assignment of a numerical value between 1 and 10, where "1" is a low correlation and "10" is a high correlation. The weights may be based on experiential information, that is, historical information of indicators associated with previously identified callbacks, or based on machine learning. The scoring engine 308 receives the weighted HQI, and develops an overall score for them. For example, the overall score may be the highest weighted value of any of the HQI, or the average, median or mode of the values of the HQIs, or may reflect only those HQI having a value above a certain threshold and then mathematically combined in some fashion (e.g. average, median or mode). It should be noted that in some embodiments of the invention plural HQI scores may be generated from the weighted values. For example, a first score may be calculated based on a predetermined number of the highest weighted values and a second score may be calculated based on a predetermined number of the next highest weighted values. Each of the HQI scores is passed to the classifier. The HQI repository 312 is configured to store the HQI score(s) and other information regarding the HQI.

Figure 3B:
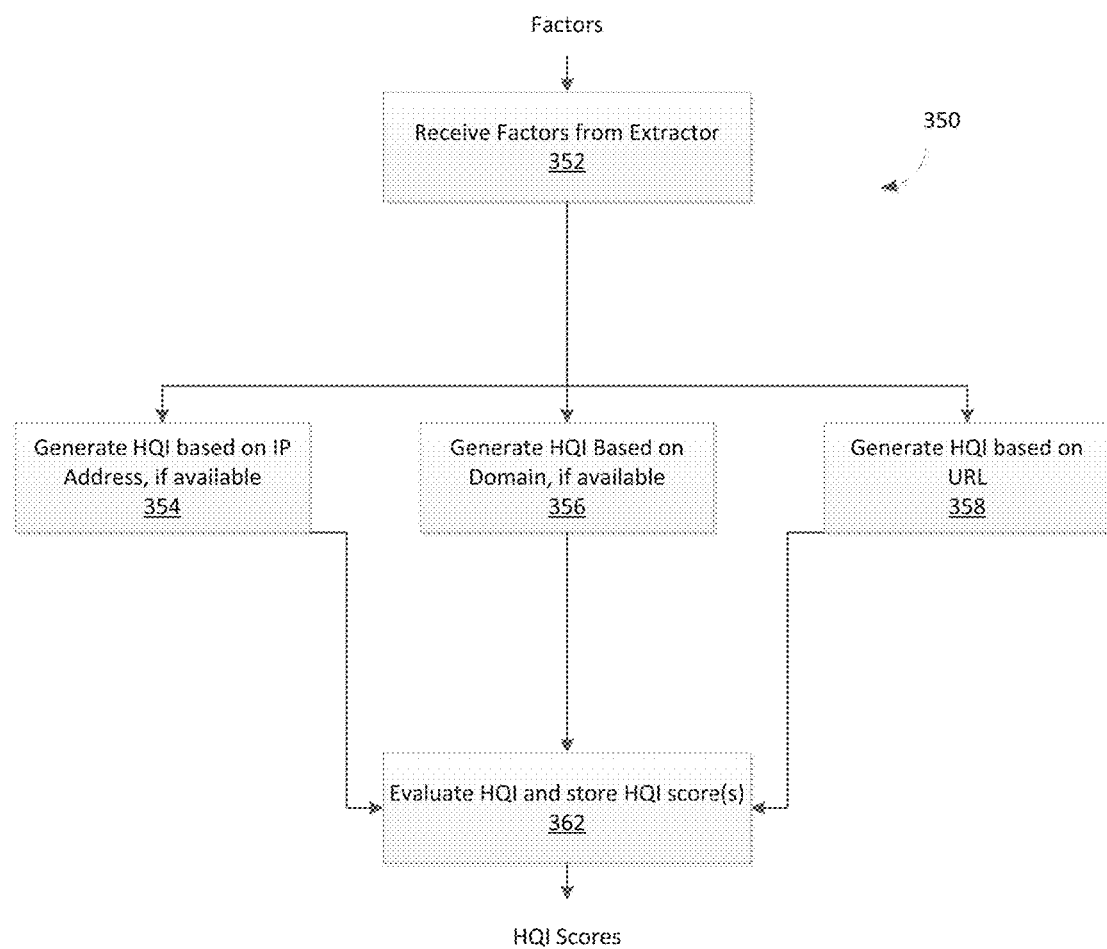
FIG. 3B is flow chart of a method for generating high quality indicators of callbacks, in accordance with an illustrative embodiment of the invention, as may be implemented by the recommender of FIG. 1A.

FIG. 3B is a flowchart of method 350 for operating the recommender 300 (FIG. 3A) in accordance with an illustrative embodiment. The method includes three branches labeled IP address, domain and/or URL for processing the respective factors received from the extractor 202 (FIG. 2A), if contained within the outbound communication. For example, some outbound communications may only contain IP addresses of their destinations and others may only have domains of their destinations. In step 352, logic receives factors associated with an outbound communication from the extractor 202 (FIG. 2A).

In step 354, logic generates HQI based on the received IP addresses. The IP address-based HQI may include, for example, indicators based on information regarding reputation, etc. For example, for purposes of generating HQI related to reputation, the logic looks-up the received IP address, if available, in the indicator database to obtain information specifying a reputation associated therewith, if such information is available, and generates an IP address reputation indicator based on the information obtained from the indicator database.

In step 356, logic generates HQI based on the received domain. The domain-based HQI may include, for example, indicators based on, for example, information regarding reputation, information from a publically available database, such as the database called WHOIS, information regarding TLD's, information regarding traffic rates or rank for that domain, etc. For example, for purposes of generating HQI related to reputation, the logic looks-up the received domain, if available, in the indicator database to obtain information specifying a reputation associated therewith, if such information is available, and generates a domain reputation indicator based on the information obtained from the indicator database.

In step 358, logic generates HQI based on a received URL. The URL-based HQI may include, for example, indicators based on information regarding reputation, number of parameters in the headers, name of each parameter, etc. For example, for purposes of generating HQI related to reputation, the logic looks-up the received URL in the indicator database to obtain information specifying a reputation associated therewith, if such information is available, and generates an URL reputation indicator based on the information obtained from the indicator database. In step 362, logic evaluates the generated HQI, assigns weights to each, develops an overall HQI score for the outbound communication and stores the HQI scores. Then, the logic provides the HQI scores to the classifier 114 (FIG. 1A).

Figure 4:
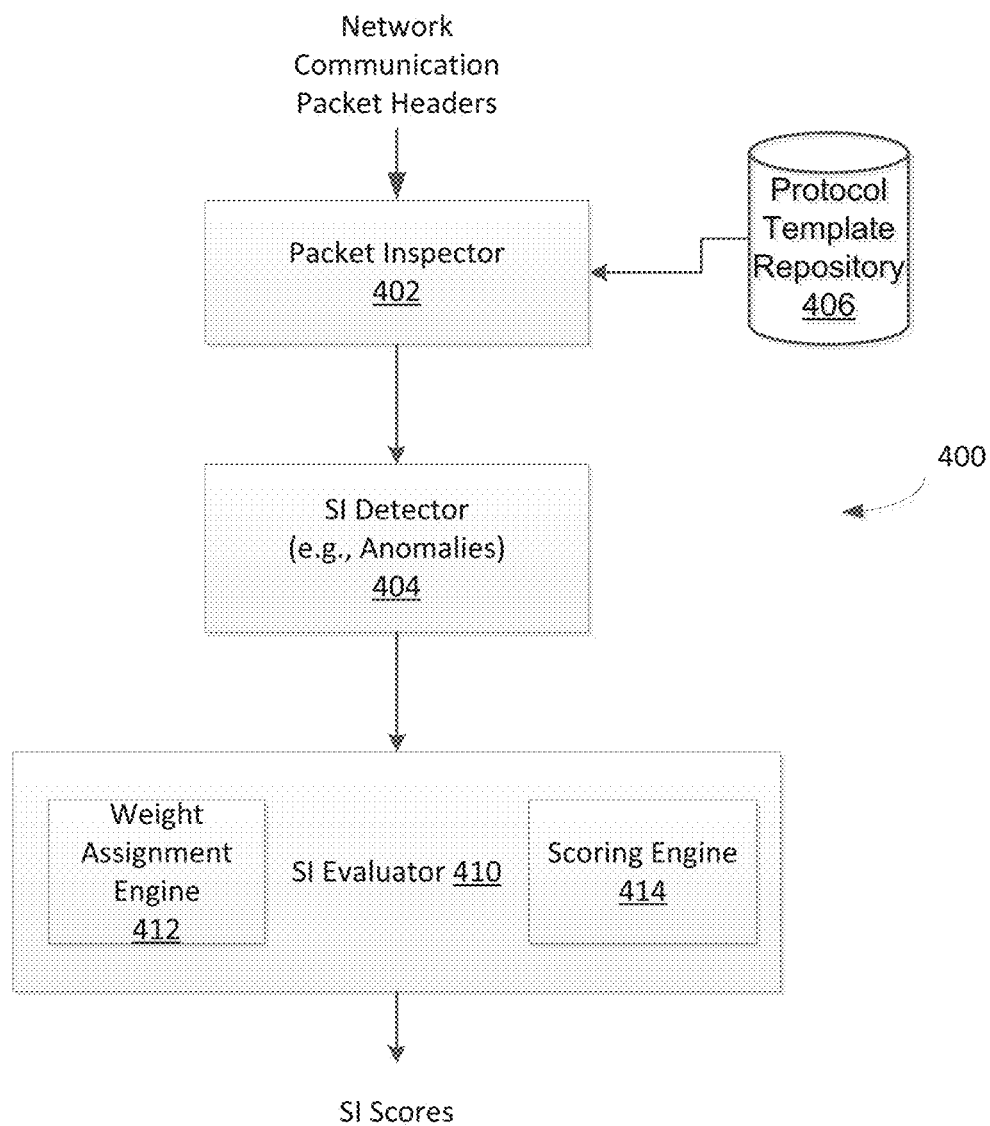
FIG. 4 is a block diagram of the supplemental influencer generator of FIG. 1A, in accordance with an illustrative embodiment of the invention.

FIG. 4 is a block diagram depicting a supplemental indicator generator 400 in accordance with an illustrative embodiment of the invention. The supplemental indicator generator 400 has a packet inspector 402, an SI detector 404 (e.g., an anomaly detector), and an SI evaluator 410. The supplemental indicator generator 400 is configured to receive outbound communication packet headers from the extractor 202 (FIG. 2A) and to inspect the various select fields thereof in light of templates provided for the applicable protocols by a protocol template database stored in repository 406. The anomaly detector 404 is configured to receive the select fields and templates from the packet inspector 402 and to detect anomalies, i.e., discrepancies or unusual content, sequence or structure in (or of) the selected fields. These anomalies may serve as supplemental indicators. Examples of protocol anomalies include: missing headers, non-standard ports (for protocol), header character errors, header sequence errors, etc. Some embodiments of the invention may also or instead employ the SI detector to detect various other items as supplemental indicators, such as certain types of reputation information related to the IP address, domain, or URL, which have a lower, yet positive correlation with command-and-control communications than those used for high quality indicators.

The SI evaluator or evaluation engine 410 is configured to assign weights and scores to the discovered SI, and pass the scores to the classifier 114 (FIG. 1A). The SI evaluator 410 includes a weight assignment engine 412 and a scoring engine 414. The weight assignment engine 306 is configured to assign a weight to each of the discovered SI in accordance with their perceived correlation with callbacks. The weights may be, for example, a numerical value between 1 and 10, where "1" is a low correlation and "10" is a high correlation. The weights may be based on experiential information, that is, historical information of indicators associated with previously identified callbacks, or based on machine learning. The scoring engine 414 receives the weighted SI, and develops an overall score for discovered SIs. For example, the overall score may be the highest weighted value of any of the SI, or the average, median or mode of the values of the SIs, or may reflect only those SI having a value above a certain threshold and then mathematically combined in some fashion (e.g. average, median or mode). It should be noted that in some embodiments of the invention plural SI scores may be generated from the weighted values. For example, a first score may be calculated based on a predetermined number of the highest weighted values and a second score may be calculated based on a predetermined number of the next highest weighted values. Each of the SI scores is passed to the classifier. The SI repository 312 is configured to store the SI score(s) and other information regarding the SI.

A further word must be added regarding the high quality indicators and supplemental indicators. Since malware evolves as malware writers devise alternative exploits and seek to evade detection, the indicators used in embodiments of the invention will likely also evolve. Certain indicators may be regarded as HQI and will need to later be used as SI, or vice versa. Indeed, certain indicators used for HQI or SI may need to be dropped in their entirety in the future, and other indicators may take their place. Accordingly, the indicators described herein as usefully employed by the various embodiments should be regarded as examples.

Figure 5A:
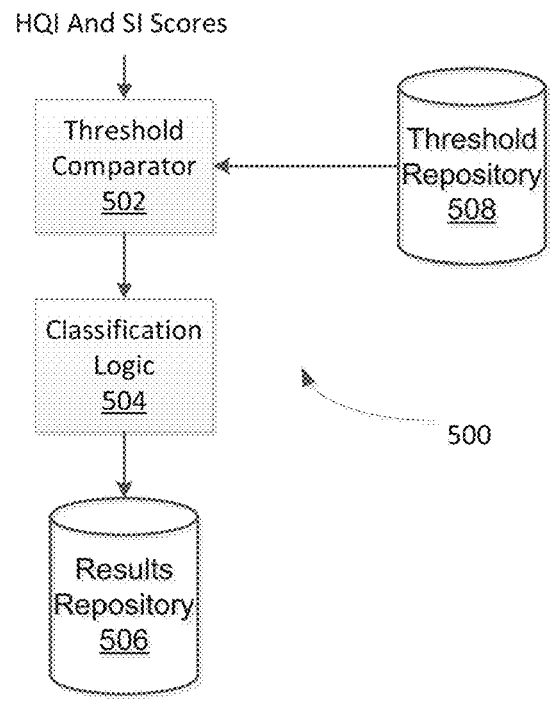
FIG. 5A is a block diagram of the classifier of FIG. 1A, in accordance with an illustrative embodiment of the invention.

FIG. 5A is a block diagram depicting a classifier 500 in accordance with an illustrative embodiment of the invention. The classifier 500 includes a threshold comparator 502, classification logic 504, and a results repository 506. The threshold comparator 502 is configured to receive the HQI score(s) and the SI score(s), and to compare the scores with one or more corresponding thresholds obtained from a threshold database stored in repository 508. In some embodiments, if all the scores are beneath the corresponding thresholds, the classifier 500 will generate a result for the corresponding outbound communication indicating, depending on the embodiment, either that (i) no definitive classification of the outbound communication as a callback could be reached, i.e., no decision could be rendered, or (ii) the outbound communication does not constitute malware. In still other embodiments, the threshold comparator 502 simply operates to discard any of the received scores that fail to exceed the corresponding thresholds, and pass the remaining scores to the classification logic 504. The classification logic 504 receives the HQI scores and the SI scores, which, in some embodiments, are limited to only those that exceed the corresponding thresholds as just described, and applies a set of rules or policies to the scores to ascertain whether or not the scores indicate that the outbound communication constitutes a callback. For example, a policy may provide as follows: (1) If any HQI score is above a high threshold T1, the outbound communication constitutes a callback, or (2) If any HQI score is above a mid-level threshold T2 (lower than T1) and any SI score is above a threshold T3, the outbound communication constitutes a callback.

Consequently, it can now be understood that the high quality indicators may be used alone to determine whether or not the outbound communication constitutes a callback, but, even if they fail to indicate that a callback is present, the supplemental indicators may be used to influence the classification or decision. Clearly, the HQI and SI can now be seen as aptly named.

Figure 5B:
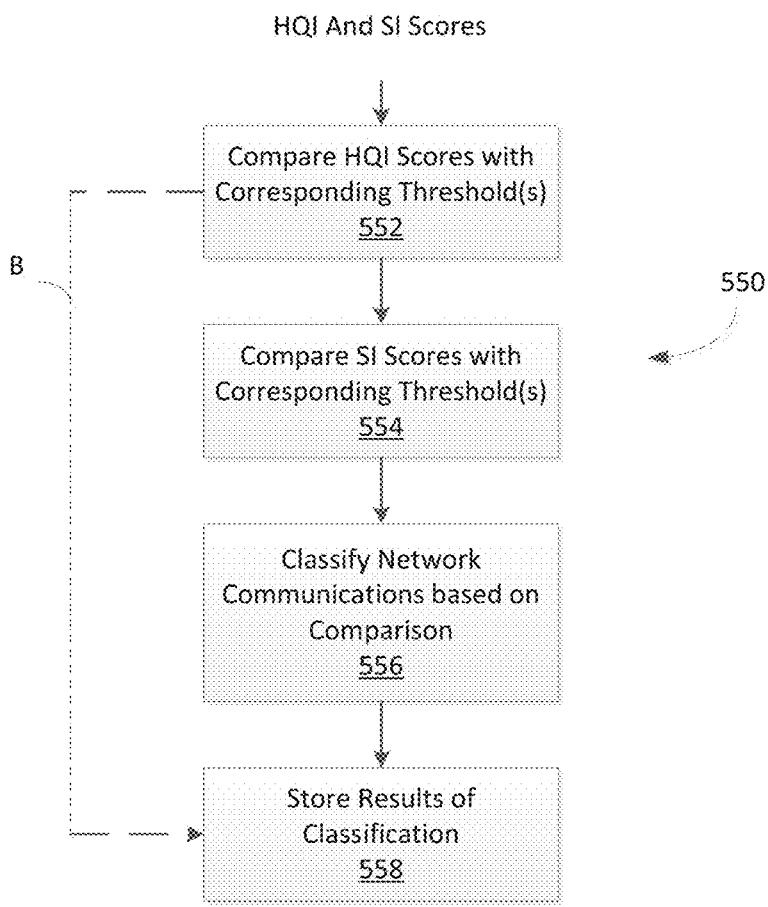
FIG. 5B is a flow chart of a method for classifying outbound communications as callbacks, in accordance with an illustrative embodiment of the invention, as may be implemented by the classifier of FIG. 1A.

FIG. 5B is a flowchart of method 550 for operating the classifier 500 (FIG. 5A) in accordance with an illustrative embodiment. In step 552, logic compares the HQI score(s) with a corresponding threshold. In step 554, logic compares the SI score(s) with a corresponding threshold. In step 556, logic classifies the outbound communication as constituting a callback based on the comparison. Then, in step 558, logic stores the results of the classification.

At this point, it is worth emphasizing, discovery that the outbound communication constitutes a callback indicates that the source of the outbound communication is infected with malware, such as a bot, and this may be a serious condition requiring immediate attention.

Figure 6:
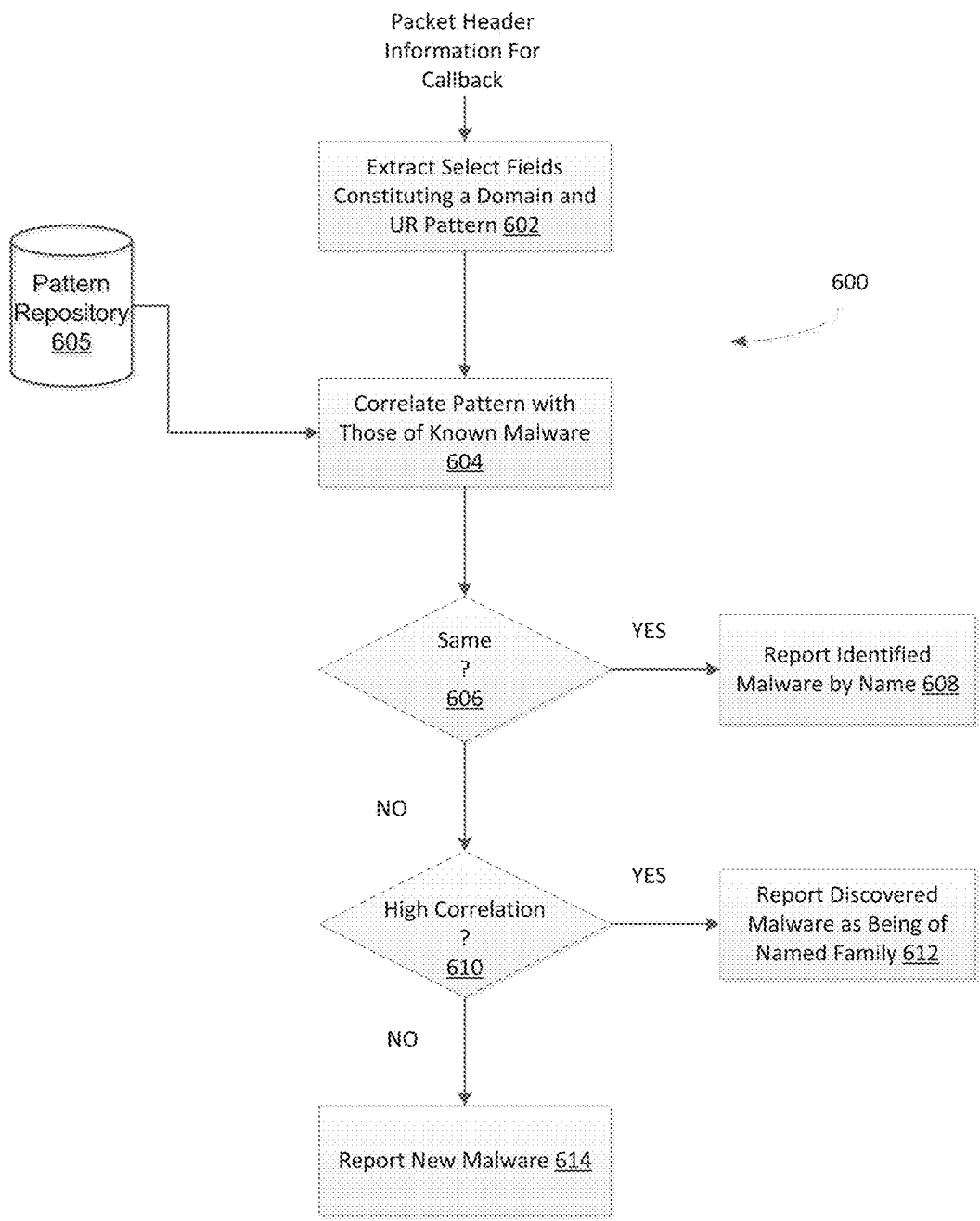
FIG. 6 is a flow chart of a method of naming malware, in accordance with an illustrative embodiment of the invention.

Returning to FIG. 1, the reporting generator 116 is configured, as noted above, to issue an alert reflecting the classification made by the classifier 114 with respect to each outbound communication. The reporting generator 116 includes a callback marker engine 120 and a naming engine 122. The callback marker engine 120 is configured to generate an identifier or marker for each callback discovered by the callback detection and analysis system 100. The naming engine 122 uses the callback marker to attempt to identify a name of known malware that corresponds to the outbound communication, either in that the newly discovered callback is likely the same as the known malware or in that the newly discovered callback is likely of the same family as the known malware. In either case, the name is a useful designation and may be used by users and administrators as a suitable handle for the newly discovered malware, may indicate the severity of the newly discovered malware, and even may indicate the actions or remediation to be employed in light of the newly discovered malware. FIG. 6 is a flowchart of method 600 for operating the naming engine 122 (FIG. 1A), in accordance with an illustrative embodiment. In step 602, logic receives packet information for an outbound communication constituting a callback, and extracts select fields therefrom constituting a domain and URL pattern that may be used as a marker for the callback. For example, the pattern may be "/temp/www/z.php?t=". In step 604, logic correlates the pattern with those of reported bot callbacks by accessing a pattern database stored in repository 605. The database may be stored locally and updated from time to time with additional patterns for discovered bot callbacks. Next, in step 606, logic decides whether the current pattern is the same as any of the stored patterns. If it is, in step 608, logic reports the name of the malware having that pattern has been discovered. A look-up in a database of the example pattern/indicator given above may result in a match with an entry identifying it as a match for the malware known by the name, "Backdoor.CY-GATE.A". If the two patterns are not the same, in step 610, logic decides whether the two patterns have a sufficiently high correlation (which may be, for example, any correlation value above a pre-determined threshold). If they do, in step 612, logic reports that the newly discovered malware is of the same family as the named malware having the highly correlated pattern. If no stored pattern has a sufficiently high correlation to the pattern of the newly discovered callback, in step 614, logic may report that a new type of malware has been discovered. The name and marker for the newly discovered malware may then be provided to a user or administrator via a user interface, e.g., by a display, or through wired or wireless communication of an alert or more fully through a report.

Reputation

It can now be seen that aspects of the foregoing embodiments relate to assessing reputation information based on URL, IP address, and/or domain metadata. Features that may provide an indication of reputation may include:

i) length of time the domain for the site has been registered, and age of the Web site;
   ii) country in which the IP address for the Web site is located,
   iii) name of ISP hosting the Web site, and whether the Web site is hosted as a consumer or business Web site;
   iv) whether the Web site uses SSL to protect transactions and the name of the SSL certificate vendor used;
   v) numbers of pages on the site, of grammar errors on a page, of links off of the Web site, of links onto the Web site, and of scripts present on the Web site;
   vi) ActiveX controls used by the Web site;
   vii) whether and the Web site loads client side JavaScript or other scripting code from other domains, and to create open "front" windows to overlay information onto the webpage;
   viii) whether the site advertises through spam messages or through adware programs;
   ix) whether the name of the owner of the Web site is withheld or obfuscated by the ISP; and/or
   x) remaining life of the domain or Web site.

Additionally, embodiments may involve using information or indicia of a reputation based at least in part on the corporate or business identity associated with the URL, domain or IP address. The corporate reputation may be based at least in part on one or more of the following: Better Business Bureau rating, and ranking of the corporation (e.g., in the Fortune 1000, Fortune 500, Fortune 100), corporate address, how long the company has been in existence, how long its Web site has been in existence, whether the corporation has an IP address in a range of addresses with a poor reputation, whether the corporation is associated with spamming or a spammer, Web site popularity rank, etc.

The foregoing reputation information may be collected in a database and/or be available through reputation Web sites, such as those associated with Better Business Bureau online, TrustE, P3P, Hackersafe certification, Fortune 1000, Hoovers, D&B, Yellow Pages, DMOZ/The Open Directory Project, Yahoo, credit card certified online merchants, or the like. Further information of reputation indicia may be had with reference to United States Patent Application 2013/0014020, filed Sep. 15, 2012, and entitled "Indicating Web site Reputations during Web site Manipulation of User Information," whose disclosure is incorporated herein by reference.

Databases and Machine Learning

The databases stored in various repositories described above may store data of a dynamic nature, which is subject to change as more information is obtained regarding malware, for instance. Various databases are described above as having data that may be developed using principles of machine learning. Machine learning refers to a process or system that can learn from data, i.e., be trained to distinguish between "good" and "bad", or in this case, between malicious and non-malicious, and classify samples under test accordingly or develop indicators having a high correlation to those that are malicious. Core principals of machine learning deal with representation and generalization, that is, representation of data instances (e.g., reputation or anomaly information), and functions performed on those instances (e.g., weighting and scoring). Generalization is the property that the process or system uses to apply what it learns on a learning set of known (or "labeled") data instances to unknown (or "unlabeled") examples. To do this, the process or system must extract learning from the labeled set that allows it to make useful predictions in new and unlabeled cases. For example, weighting of indicators (e.g., reputation or anomalies), as practiced in some embodiments described above, may entail machine learning to assure proper weights are assigned to the appropriate indicators of a current outbound communication to reflect their correlation with known malware. The data for assigning the weights may need to be updated from time to time, whether on an aperiodic or periodic basis, e.g., every three or six months, to reflect changes in malware then identified. Similarly, the data used for scoring as described above, may also need to be updated from time to time for the same reason. One way of updating the data, in either case, is to use machine learning, for example, in a malware forensic lab, to develop the appropriate data to adjust the weights and scores, and, for that matter, the thresholds and databases used in the described embodiments.

Controller Architecture

Figure 7:
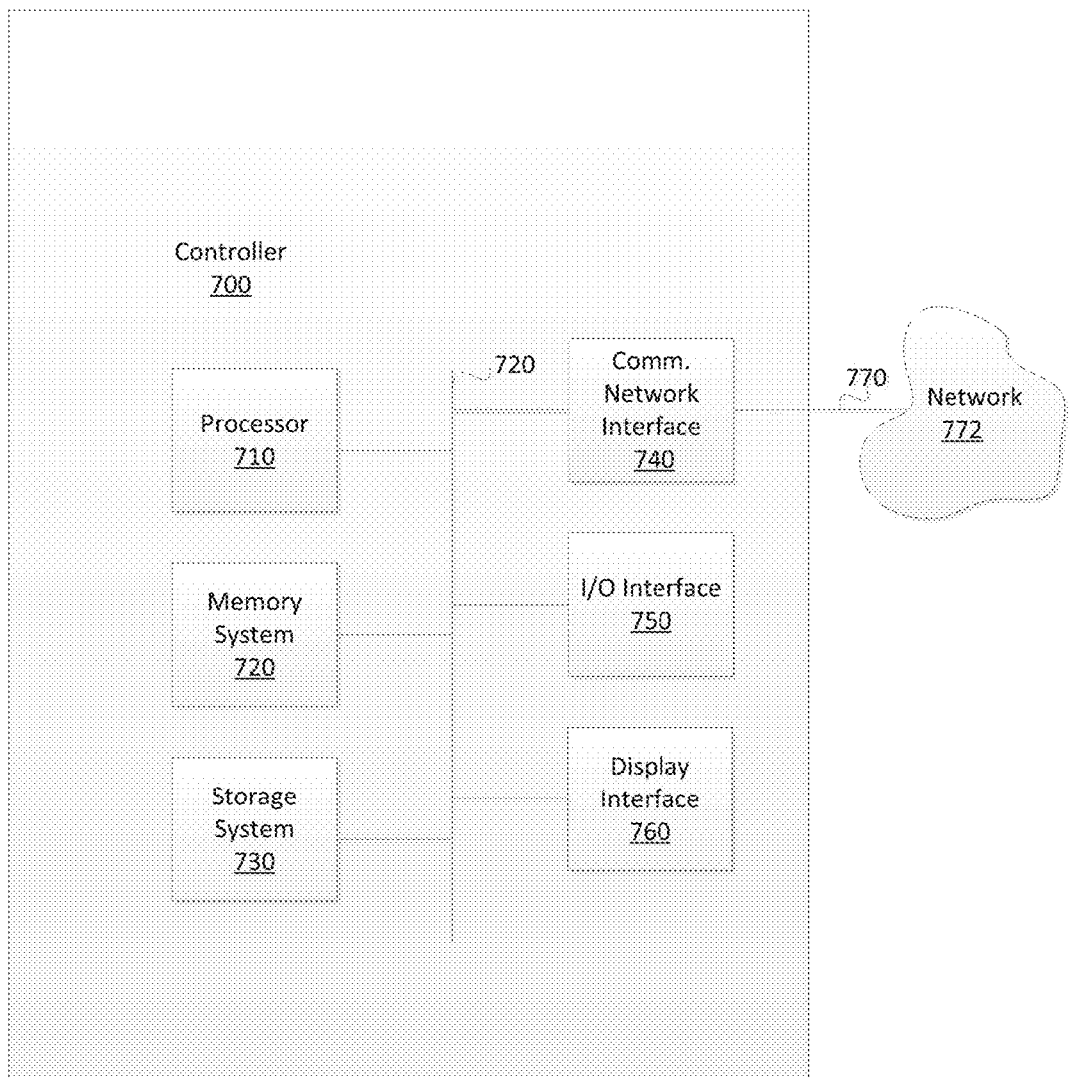
FIG. 7 is a block diagram of a processing system with a controller for implementing the embodiments or components thereof, in accordance with an illustrative embodiment of the invention.

FIG. 7 illustrates a controller 700 in accordance with an illustrative embodiment. The controller 700 may have at least a processor 710, a memory system 720, and a storage system 730, which are all coupled via an interconnect, such as bus 720. The processor 710 executes instructions. The terms, "execute" and "run", as used herein, are intended broadly to encompass the process of carrying out instructions, such as software instructions. The processor 710 may be implemented as one or more processor cores, and may be provided as a single device or as separate components. In some embodiments the processor may be implemented as a digital signal processor or application specific integrated circuits, and firmware may provide updatable logic. The memory system 720 permanently or temporarily stores data.

The memory 720 may include, for example, RAM and/or ROM. The storage system 730 also permanently or temporarily stores data. The storage system 730 may include, for example, one or more hard drives and/or flash drives, or other form of mass storage. The storage in memory 720 and storage 730 is not to be regarded as being transitory in nature. The repositories 130 (FIG. 1A) may be implemented as either memory 720 or storage system 730, or a combination thereof.

The controller 700 may also have a communication network interface 740, an input/output (I/O) interface 750, and a user interface 760. The communication network interface 740 may be coupled with a communication network 772 via a communication medium 770. The communications network interface 740 may communicate with other digital devices (not shown) via the communications medium 770. The communication interface 740 may include a network tap 940 (FIG. 9). The bus 720 may provide communications between the communications network interface 740, the processor 710, the memory system 720, the storage system 730, the I/O interface 750, and the user interface 760.

The I/O interface 750 may include any device that can receive input from or provide output to a user. The I/O interface 750 may include, but is not limited to, a flash drive, a compact disc (CD) drive, a digital versatile disc (DVD) drive, or other type of I/O peripheral (not separately shown). The user interface 760 may include, but is not limited to a keyboard, mouse, touchscreen, keypad, biosensor, display monitor or other human-machine interface (not separately shown) to allow a user to control the controller 700. The display monitor may include a screen on which is provided a command line interface or graphical user interface.

In various embodiments of the invention, a number of different controllers (for example, each of a type as illustrated and described for controller 700 may be used to implement the invention. For example, a separate controllers may be used for each of the pre-processor 104, analyzer 108, classifier 114, and report generator 116 of FIG. 1A, or for groups of (or all of) the foregoing components. Separate controllers may also be employed for the recommender 110 and supplemental generator 112 of FIG. 1A. Moreover, logic for implementing any of the methods described herein may be implemented in computer programs stored in persistent and non-transitory memory locations, such as in memory system 720 or in peripheral storage devices coupled to the controller 700 via the I/O interface 750, and executed by the processor 710. Likewise, repositories described herein may be implemented in locations of the memory system 720 and/or such peripheral storage devices.

In some embodiments, a malware detection system or station (see FIG. 8) located at a customer facility may implement both the network interface 102 and pre-processor 104 with one or more controllers; and a malware forensic system or station (not shown), e.g., located at a malware service provider's facility, may implement the analyzer 108 and classifier 114 with one or more controllers. In these embodiments, the malware detection station and the forensic station may be coupled for communication over a network. Of course, other combinations of these components may be co-located. These embodiments lend themselves to SaaS, or "Software as a Service" business models, with "cloud" based facilities. Additionally, the malware detection system may be integrated into a firewall, switch, router or other network device.

Computer System with Malicious Content Detection System

Figure 8:
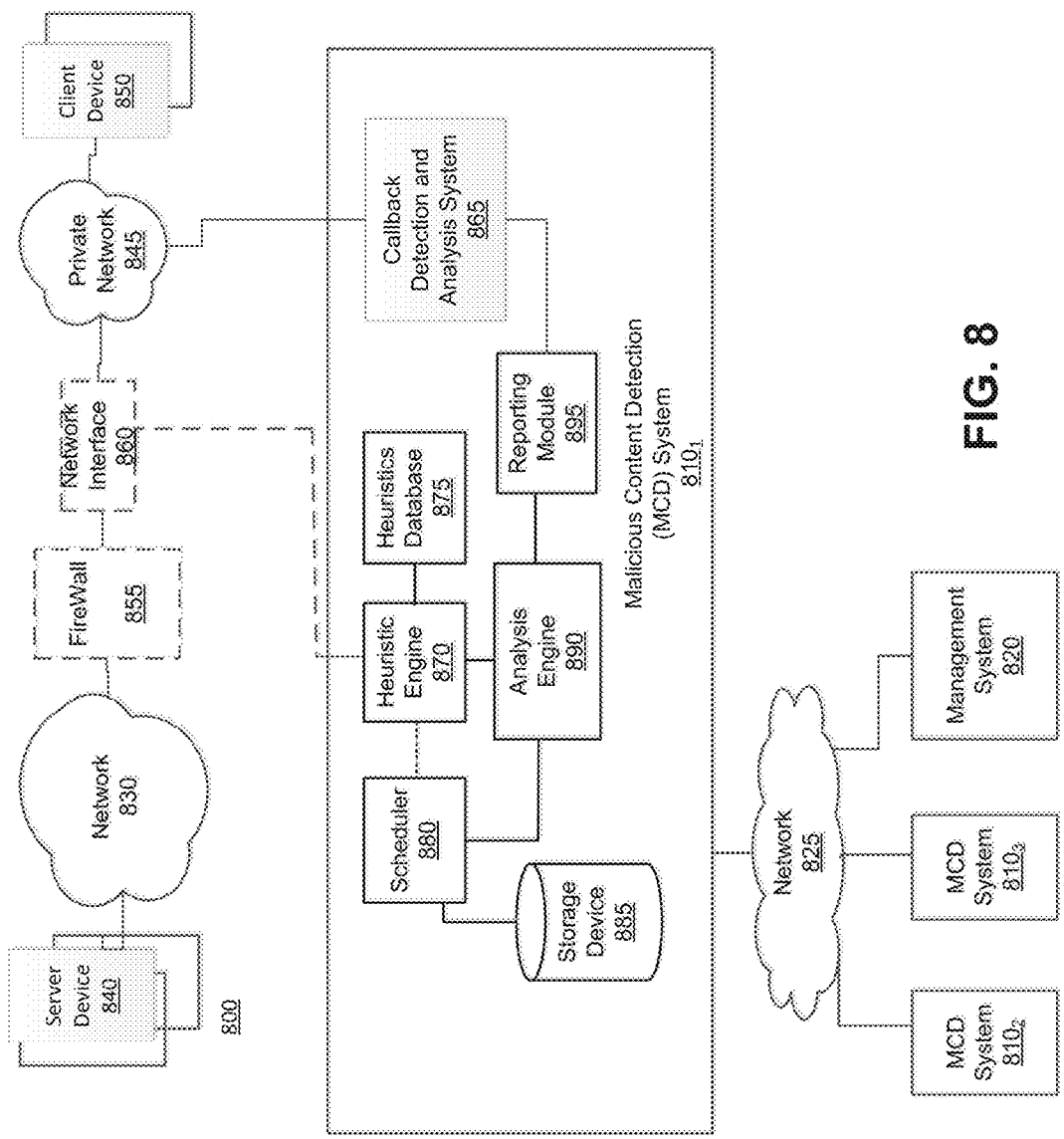
FIG. 8 is a block diagram of a computer network system deploying a malicious content detection system, including the callback detection and analysis system of FIG. 1A, in accordance with an illustrative embodiment of the invention.

Referring to FIG. 8, an exemplary block diagram of a communication system 800 deploying a plurality of malware content detection (MCD) systems $810_1$-$810_N$ (N>1, e.g. N=3) communicatively coupled to a management system 820 via a network 825 is shown. In general, management system 820 is adapted to manage MCD systems $810_1$-$810_N$. For instance, management system 820 may be adapted to cause malware signatures and other information generated as a result of malware detection by any of MCD systems $810_1$-$810_N$ to be shared with one or more of the other MCD systems $810_1$-$810_N$ including, for example, where such sharing is conducted on a subscription basis.

Herein, according to this embodiment of the invention, first MCD system $810_1$ is an electronic device that is adapted to (i) intercept data traffic that is routed over a public communication network 830 or a private communication network 845 between at least one server device 840 and at least one client device 850 and (ii) monitor, in real-time, content within the data traffic. For purposes of detecting callbacks in the data traffic, the MCD system $810_1$ intercepts and monitors data traffic outbound via private network 845 from at least one client device 850. For purposes of detecting malicious content headed to the at least one client device 850, the MCD system $810_1$ intercepts and monitors ingress traffic en route via public network 830 (e.g., the Internet) to the at least one client device 850.

More specifically, first MCD system $810_1$ may be configured to inspect content received via communication network 830, 845 and identify malware using at least two approaches. The first MCD system $810_1$ may implement the method described above in conjunction with FIG. 1B to detect and analyze outbound communications constituting callbacks. In addition, as a second approach, the first MCD system $810_1$ may identify "suspicious" content in ingress traffic for playback in a virtual environment. The incoming content is identified as "suspicious" when it is assessed, with a selected level of likelihood, that at least one characteristic identified during inspection of the content indicates the presence of malware. Thereafter, the suspicious content is further analyzed within a virtual machine (VM) execution environment to detect whether the suspicious content includes malware.

As noted, the communication network 830 may include a public computer network such as the Internet, in which case an optional firewall 855 (represented by dashed lines) may be interposed between communication network 830 and client device 850. Alternatively, the communication network 830 may be a private computer network such as a wireless telecommunication network, wide area network, or local area network, or a combination of networks. Likewise, the private network 845 may be a private computer network such as a wireless telecommunication network, wide area network, or local area network, or a combination of networks.

The first MCD system $810_1$ is shown as being coupled with the communication network 830 (behind the firewall 855) and with private network 845 via a network interface 860. The network interface 860 operates as a data capturing device (referred to as a "tap" or "network tap") that is configured to receive data traffic propagating to/from the client device 850 and provide content from the data traffic to the first MCD system $810_1$. In general, the network interface 860 receives and copies the content that is received from and provided to client device 850 normally without an appreciable decline in performance by the server device 840, the client device 850, or the communication network 830. The network interface 860 may copy any portion of the content, for example, any number of data packets.

It is contemplated that, for any embodiments where the first MCD system $810_1$ is implemented as an dedicated appliance or a dedicated computer system, the network interface 860 may include an assembly integrated into the appliance or computer system that includes network ports, network interface card and related logic (not shown) for connecting to the communication networks 830 and 845 to non-disruptively "tap" data traffic and provide a copy of the data traffic to the heuristic module 870. In other embodiments, the network interface 860 can be integrated into an intermediary device in the communication path (e.g. firewall 855, router, switch or other network device) or can be a standalone component, such as an appropriate commercially available network tap. In some embodiments, also, the network interface 860 may be contained within the first MCD system $810_1$. In virtual environments, a virtual tap (vTAP) can be used to copy traffic from virtual networks.

Referring still to FIG. 8, first MCD system $810_1$ may include a callback detection and analysis system 865 which receives the outbound communications (or a copy thereof) from the network interface for analysis in accordance with the methods described hereinabove.

The first MCD system $810_1$ may also include components for detecting malware in a two-stage malware detection approach, including a static analysis employing heuristics and a dynamic analysis employing replaying (i.e., executing) the network traffic while observing its behavior to detect malware. For this, the first MCD system $810_1$ includes a heuristic engine 870, a heuristics database 875, a scheduler 880, a storage device 885, an analysis engine 890 and a reporting module 895. Also, heuristic engine 870, scheduler 880 and/or analysis engine 890 may be software modules executed by a processor that receives the suspicious content, performs malware analysis and is adapted to access one or more non-transitory storage mediums operating as heuristic database 875, storage device 885 and/or reporting module 895. In some embodiments, the heuristic engine 870 may be one or more software modules executed by a processor, and the scheduler 880 and the analysis engine 890 may be one or more software modules executed by a different processor, where the two processors are possibly located at geographically remote locations, and communicatively coupled for example via a network.

In general, the heuristic engine 870 serves as a filter to permit subsequent malware analysis only on a portion of incoming content, which effectively conserves system resources and provides faster response time in determining the presence of malware within analyzed content. As illustrated in FIG. 8, the heuristic engine 870 receives the copy of incoming content from the network interface 860 and applies heuristics to determine if any of the content is "suspicious". The heuristics applied by the heuristic engine 870 may be based on data and/or rules stored in the heuristics database 875. Also, the heuristic engine 870 may examine the image of the captured content without executing or opening the captured content. For example, the heuristic engine 870 may examine the metadata or attributes of the captured content and/or the code image (e.g., a binary image of an executable) to determine whether a certain portion of the captured content matches or has a high correlation with a predetermined pattern of attributes that is associated with a malicious attack. According to one embodiment of the disclosure, the heuristic engine 870 flags content from one or more data flows as suspicious after applying this heuristic analysis.

Thereafter, according to one embodiment of the invention, the heuristic module 870 may be adapted to transmit at least a portion of the metadata or attributes of the suspicious content, which identify attributes of the client device 850, to the analysis engine 890 for dynamic analysis. Such metadata or attributes are used to identify the VM instance needed for subsequent malware analysis. For instance, the analysis engine 890 may be adapted to use the metadata to identify the desired software profile. Alternatively, the analysis engine 890 may be adapted to receive one or more data packets from the heuristic engine 870 and analyze the packets to identify the appropriate software profile. In yet other embodiment of the disclosure, the scheduler 880 may be adapted to receive software profile information, in the form of metadata or data packets, from the network interface 860 or from the heuristic module 870 directly.

The scheduler 880 may retrieve and configure a VM instance to mimic the pertinent performance characteristics of the client device 850. In one example, the scheduler 880 may be adapted to configure the characteristics of the VM instance to mimic only those features of the client device 850 that are affected by the data traffic copied by the network interface 860. The scheduler 880 may determine the features of the client device 850 that are affected by the content by receiving and analyzing the data traffic from the network interface 860. Such features of the client device 850 may include ports that are to receive the content, certain device drivers that are to respond to the content, and any other devices coupled to or contained within the client device 850 that can respond to the content. Alternatively, the heuristic engine 870 may determine the features of the client device 850 that are affected by the data traffic by receiving and analyzing the content from the network interface 860. The heuristic engine 870 may then transmit the features of the client device to the scheduler 880 and/or analysis engine 890.

The storage device 885 may be configured to store one or more VM disk files forming a VM profile database, where each VM disk file is directed to a different software profile for a VM instance. In one example, the VM profile database may store a VM disk file associated with a single VM instance that can be configured by the scheduler 880 to mimic the performance of a client device 850 on the communication network 830. Alternatively, as shown in FIG. 8, the VM profile database may store a plurality of VM disk files. Hence, these VM disk files are provided to simulate the performance of a wide variety of client devices 850.

The analysis engine 890 is adapted to execute multiple VM instances to simulate the receipt and/or execution of different data flows of "suspicious" content by the client device 850 as well as different operating environments. Furthermore, the analysis engine 890 analyzes the effects of such content upon the client device 850. The analysis engine 890 may identify the effects of malware by analyzing the simulation of the effects of the content upon the client device 850 that is carried out on each VM instance. Such effects may include unusual network transmissions, unusual changes in performance, and the like. This detection process is referred to as a dynamic malicious content detection.

The analysis engine 890 may flag the suspicious content as malware according to the observed behavior of the VM instance. The reporting module 895 may issue alerts indicating the presence of malware, and using pointers and other reference information, identify what message(s) (e.g. packet(s)) of the "suspicious" content may contain malware. Additionally, the server device 840 may be added to a list of malicious network content providers, and future network transmissions originating from the server device 840 may be blocked from reaching their intended destinations, e.g., by firewall 855.

Conclusion

The embodiments discussed herein are illustrative. As these embodiments are described with reference to illustrations, various modifications or adaptations of the methods and/or specific structures described may become apparent to those skilled in the art. For example, aspects of the embodiments may be performed by executable software, such as a program or operating system. For example, embodiments of the local analyzer may be implemented in an operating system. Of course, the operating system may incorporate other aspects instead of or in addition to that just described, as will be appreciated in light of the description contained in this specification. Similarly, a utility or other computer program executed on a server or other computer system may also implement the local analyzer or other aspects. Noteworthy, these embodiments need not employ a virtual environment, but rather test for callback activity during normal execution of the operating system, utility or program within a computer system.

It should be understood that the operations performed by the above-described illustrative embodiments are purely exemplary and imply no particular order unless explicitly required. Further, the operations may be used in any sequence when appropriate and may be partially used. Embodiments may employ various computer-implemented operations involving data stored in computer systems. These operations include physical manipulation of physical quantities. Usually, though not necessarily, these quantities take the form of electrical, magnetic, or optical signals capable of being stored, transferred, combined, compared, and otherwise manipulated.

Any of the operations described herein are useful machine operations. The present invention also relates to a device or an apparatus for performing these operations. The apparatus may be specially constructed for the required purpose, or the apparatus may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations, or multiple apparatus each performing a portion of the operations. Where apparatus or components of apparatus are described herein as being coupled or connected to other apparatus or other components, the connection may be direct or indirect, unless the context requires otherwise.

The present invention may be embodied as computer readable code on a computer readable medium. The computer readable medium is any data storage device that can store data, which can be thereafter read by a computer system. Examples of the computer readable medium include hard drives, flash drives, read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion. The computer readable medium can also be distributed using a switching fabric, such as used in compute farms.

The terms "logic", "module", "engine" and "unit" are representative of hardware, firmware or software that is configured to perform one or more functions. As hardware, these components may include circuitry such as processing circuitry (e.g., a microprocessor, one or more processor cores, a programmable gate array, a microcontroller, an application specific integrated circuit, etc.), receiver, transmitter and/or transceiver circuitry, semiconductor memory, combinatorial logic, or other types of electronic components. When implemented in software, the logic, modules, engines, and units may be in the form of one or more software modules, such as executable code in the form of an executable application, an operating system, an application programming interface (API), a subroutine, a function, a procedure, an applet, a servlet, a routine, source code, object code, a script, a shared library/dynamic load library, or one or more instructions. These software modules may be stored in any type of a suitable non-transitory storage medium, or transitory storage medium (e.g., electrical, optical, acoustical or other form of propagated signals such as carrier waves, infrared signals, or digital signals). Examples of non-transitory storage medium may include, but are not limited or restricted to a programmable circuit; a semiconductor memory; non-persistent storage such as volatile memory (e.g., any type of random access memory "RAM"); persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the executable code is stored in persistent storage.

Software is operational when executed by processing circuitry. Execution may be in the form of direct execution, emulation, or interpretation.

The term "computerized" generally represents that any corresponding operations are conducted by hardware in combination with software and/or firmware.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

It will be appreciated by those of ordinary skill in the art that modifications to and variations of the above-described embodiments of a system and method of detecting callbacks and associated malware may be made without departing from the inventive concepts disclosed herein. Accordingly, the specification and drawings are to be regarded as illustrative rather than restrictive, and the invention should not be viewed as limited except as by the scope and spirit of the appended claims. It will be recognized that the terms "comprising," "including," and "having," as used herein, are specifically intended to be read as open-ended terms of art.

What is claimed is:

1. A computerized method for detecting communications associated with a cyber-attack, comprising:
    parsing packets of a network communication to identify at least network addressing information within the packets;
    performing a first analysis on the network addressing information to determine whether the network addressing information corresponds to one or more high quality indicators, each high quality indicator of the one or more high quality indicators (i) identifies a strong correlation with a malicious activity and (ii) is represented by a first value being a score generated for the high quality indicator for use in classifying the network communication;
    performing a second analysis on content of the network communication other than the network addressing information to determine whether the analyzed content of the network communication corresponds to one or more supplemental indicators, each supplemental indicator of the one or more supplemental indicators (i) identifies an anomaly in the content of the network communication and (ii) is represented by a second value being a score generated for the supplemental indicator for use in classifying the network communication; and
    classifying the network communication as part of the cyber-attack by (i) classifying the network communication as being part of the cyber-attack when one or more values of the one or more high quality indicators exceeds a predetermined threshold without consideration of the one or more supplemental indicators, and (ii) in response to the one or more first values corresponding to the one or more high quality indicators failing to exceed the predetermined threshold, using the one or more second values representing the one or more supplemental indicators with at least the one or more first values to classify the communication as being part of the cyber-attack.

2. The method of claim 1, wherein the first value being a probative value that is greater than a probative value of any of the one or more corresponding values representing the one or more supplemental indicators.

3. The method of claim 1, wherein the network addressing information includes an uniform resource locator (URL).

4. The method of claim 3, wherein the network communication is classified as being part of the cyber-attack when the one or more first values of the first high quality indicator exceeds the predetermined threshold.

5. The method of claim 3, wherein the one or more second values representing the one or more supplemental indicators are used with at least the one or more first values to classify the network communication as being part of the cyber-attack in response to the one or more first values of the one or more high quality indicators failing to exceed the predetermined threshold and being greater than a second predetermined threshold that is less than the predetermined threshold.

6. The computerized method of claim 3, wherein the cyber-attack includes a command and control (CnC) communication operating as a callback.

7. The method of claim 3, wherein the performing of the first analysis on the network addressing information of the network communication comprises determining whether the URL compares to any of a plurality of URLs that are known to be associated with malicious activity that is part of the cyber-attack.

8. The method of claim 7, wherein the determining whether the URL compares to any of the plurality of URLs comprises performing a hash operation on the URL to produce a hash result and comparing the hash result to a plurality of hash results that correspond to a plurality of URLs for previously analyzed communications that are determined to be part of the cyber-attack.

9. The method of claim 3, wherein the performing of the first analysis on the network addressing information of the network communication comprises assessing reputation information associated with the URL and determining whether the URL is associated with the malicious activity that is part of the cyber-attack based on the reputation information.

10. The method of claim 9, wherein the reputation information includes at least one of (i) a length of time a domain associated with the URL has been registered, or (ii) a country in which an Internet Protocol (IP) address of the URL is located.

11. The method of claim 10, wherein the reputation information further includes at least one of (i) a determination whether a web site accessible via the URL uses a security protocol to protect communications with the web site, or (ii) a name of the Internet Service Provider (ISP) hosting the web site.

12. The method of claim 3, wherein the performing of the first analysis on the network addressing information of the network communication comprises an analysis of a reputation of a domain name of the URL to determine a probability that a detected presence of the domain name indicates the network communication is part of the cyber-attack.

13. The method of claim 3, wherein the performing of the first analysis on the network addressing information of the network communication comprises an analysis of a reputation of an Internet Protocol (IP) address of the URL to determine a probability that a detected presence of the IP address indicates the network communication is part of the cyber-attack.

14. The method of claim 1, where the performing of the second analysis on the content of the network communication other than the network addressing information comprises performing an analysis of components of a header of the network communication being a network communication to detect a protocol anomaly.

15. The method of claim 1, wherein the performing of the first analysis, the performing of the second analysis and the classifying of the communication is entirely conducted with a cloud based facility.

16. The method of claim 1, wherein the performing of the first analysis, the performing of the second analysis and the classifying of the communication is entirely conducted with a malware content detection (MCD) system.

17. The method of claim 1, wherein the first value being a probative value representing a mathematical combination of the one or more values associated with the one or more high quality indicators, including the first value.

18. A computer implemented method for detecting a cyber-attack, comprising:
performing a first analysis on an uniform resource locator (URL) included as part of a network communication to determine whether the URL corresponds to at least a first high quality indicator, the first high quality indicator (i) identifying a strong correlation with a malicious activity and (ii) being represented by at least a first probative value being a score generated for the first high quality indicator for use in classifying the network communication;
performing a second analysis on metadata related to the URL included as part of the network communication to determine whether the analyzed metadata corresponds to one or more supplemental indicators, each of the one or more supplemental indicators being represented by a second value being a score generated for the supplemental indicator for use in classifying the network communication; and
classifying the network communication including the URL as part of the cyber-attack by (i) classifying the network communication as being part of the cyber-attack when the first probative value exceeds a predetermined threshold without consideration of the corresponding probative values associated with the one or more supplemental indicators, and (ii) in response to the first high quality indicator failing to classify the network communication, using the corresponding probative values associated with the one or more supplemental indicators with at least the first probative value to classify the network communication as being part of the cyber-attack.

19. The method of claim 18, wherein the first probative value is greater than any corresponding probative value for the one or more supplemental indicators.

20. The method of claim 18, wherein the metadata includes attributes related to content within data packets forming the network communication.

21. The method of claim 18, wherein the content within the data packets include content within one or more headers of the data packets forming the network communication, the content being different than the URL.

22. The method of claim 18, wherein the metadata includes attributes of suspicious content being part of the network communication and targeted to a destination accessible via the URL.

23. The method of claim 18, wherein the performing of the first analysis on the URL comprises parsing packets of the network communication to extract the URL and determining whether the URL compares to any of a plurality of URLs that are known to be associated with malicious activity that is part of the cyber-attack.

24. A system for detecting a cyber attack, comprising:
one or more processors;
a memory communicatively coupled to the one or more processors, the memory includes
a recommending engine that, when executed by the one or more processors, is configured to perform a first analysis on network addressing information of packets of a network communication to determine whether the network addressing information corresponds to one or more high quality indicators, each high quality indicator of the one or more high quality indicators (i) identifies a strong correlation with a malicious activity and (ii) is represented by a second value being a score generated for the supplemental indicator for use in classifying the network communication,
a supplemental indicator generator that, when executed by the one or more processors, is configured to perform a second analysis on content of the network communication other than the network addressing information to determine whether the analyzed content of the network communication corresponds to one or more supplemental indicators, each supplemental indicator of the one or more supplemental indicators (i) identifies an anomaly in the content of the network communication and (ii) is represented by a second value being a score generated for the supplemental indicator for use in classifying the network communication, and
a classifying engine that, when executed by the one or more processors, is configured to classify the network communication as part of the cyber-attack by at least (i) classifying the communication as being part of the cyber-attack when at least the first value, representing at least the one or more high quality indicators exceeds a predetermined threshold without consideration of the one or more second values of the one or more supplemental indicators, and (ii) in response to the one or more first values falling below the predetermined threshold, using the one or more second values representing the one or more supplemental indicators with at least the one or more first values to classify the communication as being part of the cyber-attack.

25. The system of claim 24, wherein the memory further comprising:
a report generator that, when executed by the one or more processors, is configured to issue an alert in response to the classifying engine classifying the communication as a part of a cyber-attack.

* * * * *